(12) United States Patent
Chen et al.

(10) Patent No.: US 12,519,329 B2
(45) Date of Patent: Jan. 6, 2026

(54) CHARGING METHOD, DEVICE, AND SYSTEM

(71) Applicant: Huawei Technologies Co., Ltd., Shenzhen (CN)

(72) Inventors: Liangjin Chen, Shanghai (CN); Qinghui Hou, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 647 days.

(21) Appl. No.: 17/909,104

(22) PCT Filed: Mar. 2, 2021

(86) PCT No.: PCT/CN2021/078659
§ 371 (c)(1),
(2) Date: Sep. 2, 2022

(87) PCT Pub. No.: WO2021/175209
PCT Pub. Date: Sep. 10, 2021

(65) Prior Publication Data
US 2023/0095625 A1  Mar. 30, 2023

(30) Foreign Application Priority Data
Mar. 6, 2020  (CN) .......................... 202010152362.8

(51) Int. Cl.
*H02J 7/00* (2006.01)
(52) U.S. Cl.
CPC .......... *H02J 7/0044* (2013.01); *H02J 7/0031* (2013.01); *H02J 7/0049* (2020.01); *H02J 7/00716* (2020.01); *H02J 7/007182* (2020.01)

(58) Field of Classification Search
CPC .............................. H02J 7/0044; H02J 7/0045
USPC ................................................... 320/113, 114
See application file for complete search history.

(56) References Cited

U.S. PATENT DOCUMENTS

| | | | |
|---|---|---|---|
| 9,997,940 B2* | 6/2018 | Xu | H02J 7/342 |
| 10,461,556 B2* | 10/2019 | Guo | H02J 7/00 |
| 10,553,915 B1* | 2/2020 | Li | H02J 7/00714 |
| 11,218,007 B1* | 1/2022 | Moubedi | H02J 7/0042 |
| 11,476,681 B2* | 10/2022 | Hong | H01M 10/425 |
| 2011/0279095 A1* | 11/2011 | Hong | H02J 7/00 320/164 |
| 2017/0094394 A1 | 3/2017 | McPeak et al. | |
| 2018/0123355 A1 | 5/2018 | Olson et al. | |
| 2019/0252904 A1 | 8/2019 | Tian et al. | |
| 2020/0106081 A1* | 4/2020 | Suzuki | H01M 10/44 |

(Continued)

FOREIGN PATENT DOCUMENTS

| | | |
|---|---|---|
| CN | 201341028 Y | 11/2009 |
| CN | 101982922 A | 3/2011 |

(Continued)

*Primary Examiner* — Nathaniel R Pelton
(74) *Attorney, Agent, or Firm* — Slater Matsil, LLP

(57) ABSTRACT

The present disclosure provides a charging method, device, and system. The charging device includes a voltage regulation circuit, and can charge a charged device through voltage step-down or voltage step-up. In addition, the charging device and a charged device can transfer statuses of a circuit and a battery through a change of a switch status, so that the charging device can regulate a charging voltage and/or a charging current based on the statuses of the circuit and the battery.

20 Claims, 9 Drawing Sheets

(56) References Cited

U.S. PATENT DOCUMENTS

| | | | |
|---|---|---|---|
| 2020/0169094 A1* | 5/2020 | Li | H02J 7/007 |
| 2020/0195031 A1* | 6/2020 | Weng | H02J 7/0044 |
| 2021/0050735 A1* | 2/2021 | Chien | H02J 7/00302 |

FOREIGN PATENT DOCUMENTS

| | | | |
|---|---|---|---|
| CN | 107231014 A | 10/2017 | |
| CN | 109474034 A | 3/2019 | |
| CN | 110166866 A | 8/2019 | |
| CN | 110224457 A | 9/2019 | |
| CN | 209626986 U | 11/2019 | |
| CN | 110556892 A | 12/2019 | |
| JP | H08116604 A | 5/1996 | |

\* cited by examiner

CHARGING METHOD, DEVICE, AND SYSTEM

CROSS-REFERENCE TO RELATED APPLICATIONS

This application is a National Stage of International Application No. PCT/CN2021/078659, filed on Mar. 2, 2021, which claims priority to Chinese Patent Application No. 202010152362.8, filed on Mar. 6, 2020, both of which are hereby incorporated by reference in their entireties.

TECHNICAL FIELD

This application relates to the mobile charging field, and in particular, to a charging method, device, and system.

BACKGROUND

Currently, a wireless headset or wearable product (for example, a smartwatch or band) is connected to a charger or a dock in a form of a contact for charging.

FIG. 1 shows an architecture in which charging is performed on a charging device and a charged device by using contacts. The charging device includes a charging interface, a charging circuit, a boost circuit, a control apparatus, a battery, a switch, and two contacts. The charged device includes a buck charging circuit, a control apparatus, a battery, a switch, and two contacts. However, in the foregoing architecture, because a charging process includes two processes: a voltage step-up process and a voltage step-down process, an actual charging efficiency loss is relatively large, and overall efficiency is about 54% to 78%. In addition, because the lost power supply is converted into heat, a charging speed and endurance of the battery in the charging device are also lost to some extent.

SUMMARY

An objective of the present invention is to provide a charging method, device, and system, to reduce space of a charged apparatus, reduce an energy loss and heat generation in a charging process, improve charging efficiency, and increase a charging speed.

The foregoing objective and other objectives are achieved by using features in the independent claims. Further implementations are embodied in the dependent claims, the specification, and the accompanying drawings.

According to a first aspect, a charging system is provided. The system may include a second device and a first device. The first device includes a first contact and a second contact. The second device includes a third contact and a fourth contact. The first device is connected to the second device by using a contact. The first device charges the second device. The second device includes a first energy storage apparatus. The first device includes a first interface, a first circuit, a first control apparatus, a first voltage measurement apparatus, and a first current measurement apparatus. The first interface is configured to connect to an external power supply. The first interface is connected to the first circuit. The first circuit includes a voltage regulation circuit. The voltage regulation circuit is configured to: when the first device is connected to the second device, step down an output voltage based on a voltage between the first contact and the second contact, to charge the second device. The first voltage measurement apparatus is configured to measure the voltage between the first contact and the second contact. The first current measurement apparatus is configured to measure a current in a circuit of the first device. The first control apparatus is connected to the first circuit, the first voltage measurement apparatus, and the first current measurement apparatus. The first control apparatus is configured to control, in a charging process, the first circuit to regulate a charging voltage and/or a charging current.

The first interface may be a charging interface. The first energy storage apparatus may be a battery. A second control apparatus and the first control apparatus each may be a digital circuit, an FPGA, or a micro processing unit (MCU). The first contact, the second contact, the third contact, and the fourth contact each may be a Pogo pin, a metal dome, or a USB interface. The voltage regulation circuit may be a buck-boost charging circuit or a buck charging circuit.

According to the technical solution described in the first aspect, space of a charged apparatus can be reduced, an energy loss and heat generation in the charging process can be reduced, charging efficiency can be improved, and a charging speed can be increased.

According to the first aspect, in a possible implementation, the voltage regulation circuit is further configured to: when the first device is connected to the second device, step up the output voltage based on the voltage between the first contact and the second contact, to charge the second device.

According to the foregoing implementation, a charging circuit can support a boost charging manner.

According to the first aspect, in a possible implementation, the second device further includes a first switch, a second control apparatus, a second voltage measurement apparatus, and a second current measurement apparatus. The second control apparatus is connected to the second voltage measurement apparatus, the second current measurement apparatus, and the first switch. The second voltage measurement apparatus is configured to measure a voltage between two ends of the first energy storage apparatus. The second current measurement apparatus is configured to measure a current in a circuit of the second device. The first switch is connected to the third contact and the first energy storage apparatus. The second control apparatus is configured to control, based on a voltage value measured by the second voltage measurement apparatus and/or a current value measured by the second current measurement apparatus, the first switch to be turned on or off. When the first switch is turned on, the third contact of the second device is connected to the first energy storage apparatus, and when the first switch is turned off, the third contact is disconnected from the first energy storage apparatus.

According to the foregoing implementation, the charging circuit can be protected.

According to the first aspect, in a possible implementation, the first voltage measurement apparatus and the first current measurement apparatus are included in the first control apparatus or the first circuit, and/or the second voltage measurement apparatus and the second current measurement apparatus are included in the second control apparatus.

According to the foregoing implementation, the control apparatus can measure a voltage and a current.

According to the first aspect, in a possible implementation, the first voltage measurement apparatus and the first current measurement apparatus are a first voltage and current measurement apparatus, and/or the second voltage measurement apparatus and the second current measurement apparatus are a second voltage and current measurement apparatus.

According to the foregoing implementation, measurement of a voltage and a current may be completed by one component.

According to the first aspect, in a possible implementation, the first device further includes a second energy storage apparatus. The second energy storage apparatus is configured to charge the second device when the first interface is not connected to the external power supply.

According to the foregoing implementation, the first device can charge the second device when the first device is not connected to the external power supply.

According to the first aspect, in a possible implementation, the first switch is turned off when the second control apparatus determines that the first energy storage component is fully charged.

According to the foregoing implementation, the control apparatus can control the charging process.

According to the first aspect, in a possible implementation, the first device charges the second device in a plurality of modes.

According to the foregoing implementation, the energy storage apparatus of the second device can be protected.

According to the first aspect, in a possible implementation, when the first device charges the second device, if a voltage value between the two ends of the first energy storage component exceeds a second voltage threshold and/or a current value of the second device exceeds a second current threshold, the second control apparatus controls the first switch to be turned off.

According to the foregoing implementation, when an overvoltage or overcurrent occurs in the charging process, the circuit and the energy storage apparatus can be protected.

According to the first aspect, in a possible implementation, when the voltage between the two ends of the first energy storage component exceeds a second voltage threshold, the second control apparatus controls the first switch to be turned off for first duration, and the first control apparatus controls, based on the first duration, the first circuit to step down the output voltage; and when a current value of the second device exceeds a second current threshold, the second control apparatus controls the first switch to be turned off for second duration, and the first control apparatus controls, based on the second duration, the first circuit to reduce a current.

According to the foregoing implementation, the second device can control duration during which the switch is turned off, so that the first device obtains a circuit status.

According to the first aspect, in a possible implementation, when the voltage between the two ends of the first energy storage apparatus is less than a first voltage threshold, the second control apparatus controls the first switch to be turned off for third duration, and the first control apparatus controls, based on the third duration, the first circuit to charge the second device in a first mode; when the voltage between the two ends of the first energy storage apparatus is greater than a first voltage threshold and less than a third threshold, the second control apparatus controls the first switch to be turned off for fourth duration, and the first control apparatus controls, based on the fourth duration, the first circuit to charge the second device in a second mode; or when the voltage between the two ends of the first energy storage apparatus is equal to a third threshold, the second control apparatus controls the first switch to be turned off for fifth duration, and the first control apparatus controls, based on the fifth duration, the first circuit to charge the second device in a third mode.

According to the foregoing implementation, the second device can control duration during which the switch is turned off, so that the first device obtains indication about a charging mode.

According to the first aspect, in a possible implementation, the second device further includes a second switch, and the first device includes a third switch and a fourth switch. The second switch is connected to the third contact and the second control apparatus. The third switch is connected to the first contact and the first circuit. The fourth switch is connected to the first contact and the first control apparatus. The second control apparatus controls the second switch to be turned on or off. The first control apparatus separately controls the third switch and the fourth switch to be turned on or off.

According to the foregoing implementation, the charging circuit or a communication circuit is formed by turning different switches on or off.

According to the first aspect, in a possible implementation, when the second device meets a first condition, the second control apparatus controls the first switch to be turned off and the second switch to be turned on. The first control apparatus controls, based on a current change of the circuit, the third switch to be turned off and the fourth switch to be turned on. The second control apparatus sends first information to the first control apparatus. The first information indicates that the second device meets the first condition.

According to the foregoing implementation, a communication circuit is formed by turning different switches on or off to transmit information.

According to the first aspect, in a possible implementation, the first switch is a bidirectional switch. The first switch is connected to the first energy storage apparatus and the second control apparatus. The first device includes a fifth switch. The fifth switch is a bidirectional switch. The fifth switch is connected to the first circuit and the first control apparatus. The second control apparatus controls the first switch to be connected to the first energy storage apparatus or the second control apparatus. The first control apparatus controls the fifth switch to be connected to the first circuit or the first control apparatus.

According to the foregoing implementation, the charging circuit or a communication circuit is formed by turning different switches on or off.

According to the first aspect, in a possible implementation, when the second device meets a first condition, the second control apparatus controls the first switch to be connected to the second control apparatus. The first control apparatus controls, based on a current change of the circuit, the fifth switch to be connected to the first control apparatus. The second control apparatus sends first information to the first control apparatus, where the first information indicates that the second device meets the first condition.

According to the foregoing implementation, a communication circuit is formed by turning different switches on or off to transmit information.

According to the first aspect, in a possible implementation, the first condition is that a voltage between two ends of the first energy storage apparatus is greater than a second voltage threshold, or less than a first voltage threshold, or greater than a first voltage threshold and less than a second voltage threshold, or equal to a second voltage threshold, or a current value of the second device is greater than a second current threshold, or less than a first current threshold.

According to the foregoing implementation, the first device can indicate different circuit statuses based on different information.

According to the first aspect, in a possible implementation, the second device further includes a magnetic apparatus, the first device further includes a magnetic field sensor, and the magnetic apparatus and the magnetic field sensor are configured to detect whether the second device is connected to the first device.

According to the foregoing implementation, whether the second device is connected to the first device can be determined.

According to a second aspect, a charging method is provided. The method includes: A first device includes a first contact and a second contact, a second device includes a third contact and a fourth contact, and the first device measures a first voltage between the contacts of the second device; the first device sets a charging voltage and/or a charging current based on the first voltage; the first device charges the second device, the second device includes a first energy storage apparatus, and the first device includes a buck charging circuit or a buck-boost charging circuit; the buck-boost charging circuit is configured to: when the first device is connected to the second device, step up or down an output voltage based on a voltage between the first contact and the second contact, to charge the second device; and the buck charging circuit is configured to: when the first device is connected to the second device, step down the output voltage based on the voltage between the first contact and the second contact, to charge the second device.

The first device may be a charging device, and the second device may be a charged device. According to the technical solution described in the second aspect, an energy loss and heat generation in a charging process can be reduced, charging efficiency can be improved, and a charging speed can be increased.

According to the second aspect, in a possible implementation, the first device determines, by using a magnetic field sensor or an optical sensor or by detecting a voltage between the third contact and the fourth contact, whether the first device is connected to the second device.

According to the foregoing implementation, the first device can determine, in a plurality of manners, whether the charging device is connected to the charged device.

According to the second aspect, in a possible implementation, the first device compensates for the charging voltage based on an impedance in a charging circuit.

According to the foregoing implementation, the first device can increase the charging speed.

According to the second aspect, in a possible implementation, the first device charges the second device in a plurality of modes.

According to the foregoing implementation, the energy storage apparatus of the second device can be protected.

According to the second aspect, in a possible implementation, if the second device meets a first condition, the second device cuts off a current.

According to the foregoing implementation, the circuit and the energy storage apparatus can be protected.

According to the second aspect, in a possible implementation, the first condition is that a voltage between two ends of the first energy storage apparatus is greater than a second voltage threshold, or less than a first voltage threshold, or greater than a first voltage threshold and less than a second voltage threshold, or equal to a second voltage threshold, or a current value of the second device is greater than a second current threshold, or less than a first current threshold.

According to the foregoing implementation, the circuit and the energy storage apparatus can be protected, and different circuit statuses can be responded to.

According to the second aspect, in a possible implementation, when a voltage between two ends of the first energy storage component is greater than a second voltage threshold, the second device controls a current to be cut off for first duration, and the first device steps down the output voltage based on the first duration; or when a current value of the second device is greater than a second current threshold, the second device controls a current to be cut off for second duration, and the first device reduces the current based on the second duration.

According to the foregoing implementation, the second device can control duration during which the current is cut off, so that the first device obtains a circuit status.

According to the second aspect, in a possible implementation, when a voltage between two ends of the first energy storage apparatus is less than a first voltage threshold, the second device controls a current to be cut off for third duration, and the first device charges the second device in a first mode based on the third duration; when a voltage between two ends of the first energy storage apparatus is greater than a first voltage threshold and less than a third threshold, the second device controls a current to be cut off for fourth duration, and the first device charges the second device in a second mode based on the fourth duration; or when a voltage between two ends of the first energy storage apparatus is equal to a third threshold, the second device controls a current to be cut off for fifth duration, and the first device charges the second device in a third mode based on the fifth duration.

According to the foregoing implementation, the second device can control duration during which a switch is turned off, so that the first device obtains indication about a charging mode.

According to the second aspect, in a possible implementation, a first communication circuit and a first charging circuit are disposed in the second device, and a second communication circuit and a second charging circuit are disposed in the first device. When the second device meets a first condition, the second device cuts off the first charging circuit and conducts the first communication circuit. When determining that a current value of a circuit changes to 0, the first device cuts off the second charging circuit, and conducts the second communication circuit. The second device sends a first message to the first device, where the first message indicates that the second device meets the first condition.

According to the foregoing implementation, the second device and the first device can control the communication circuit and the charging circuit to be connected and disconnected, so that the first device and the second device are charged or communicate with each other.

According to a third aspect, a charging device is provided. The device may include a first contact, a second contact, a first interface, a first circuit, a first control apparatus, a first voltage measurement apparatus, and a first current measurement apparatus. The first interface is configured to connect to an external power supply. The first interface is connected to the first circuit. The first circuit includes a voltage regulation circuit. The voltage regulation circuit is configured to step down an output voltage based on a voltage between the first contact and the second contact. The first voltage measurement apparatus is configured to measure the voltage between the first contact and the second contact. The first current measurement apparatus is configured to measure a current in a circuit. The first control apparatus is connected to the first circuit, the first voltage measurement apparatus, and the first current measurement apparatus. The first control apparatus is configured to control, in a charging process, the first circuit to regulate a charging voltage and/or a charging current.

The first interface may be a charging interface. The first control apparatus may be a digital circuit, an FPGA, or a micro processing unit (MCU). The first contact and the second contact each may be a Pogo pin, a metal dome, or a USB interface.

According to the technical solution described in the third aspect, space of a charged apparatus can be reduced, an energy loss and heat generation in the charging process can be reduced, charging efficiency can be improved, and a charging speed can be increased.

According to the third aspect, in a possible implementation, the voltage regulation circuit is further configured to: when a first device is connected to a second device, step up the output voltage based on the voltage between the first contact and the second contact, to charge the second device.

According to the foregoing implementation, a charging circuit can support a boost charging manner.

According to the third aspect, in a possible implementation, the first voltage measurement apparatus and the first current measurement apparatus are included in the first control apparatus or the first circuit.

According to the foregoing implementation, the control apparatus can measure a voltage and a current.

According to the third aspect, in a possible implementation, the first voltage measurement apparatus and the first current measurement apparatus are a first voltage and current measurement apparatus.

According to the foregoing implementation, measurement of a voltage and a current may be completed by one component.

According to the third aspect, in a possible implementation, the first device further includes a second energy storage apparatus. The second energy storage apparatus is configured to charge the second device when the first interface is not connected to the external power supply.

According to the foregoing implementation, the device can charge the second device when the device is not connected to the external power supply.

According to the third aspect, in a possible implementation, the device charges the second device in a plurality of modes.

According to the foregoing implementation, an energy storage apparatus of a second device can be protected.

According to the third aspect, in a possible implementation, after the first control apparatus determines that a current value of a circuit is 0, duration in which the detected current value is 0 is first duration, and the first control apparatus controls, based on the first duration, the first circuit to step down the output voltage; and after the first control apparatus determines that a current value of the circuit is 0, duration in which the detected current value is 0 is second duration, and the first control apparatus controls, based on the second duration, the first circuit to reduce a current.

According to the foregoing implementation, the device can obtain a circuit status.

According to the third aspect, in a possible implementation, after the first control apparatus determines that a current value of a circuit is 0, duration in which the detected current value is 0 is third duration, and the first control apparatus controls, based on the third duration, the first circuit to charge a second device in a first mode; after the first control apparatus determines that a current value of a circuit is 0, duration in which the detected current value is 0 is fourth duration, and the first control apparatus controls, based on the fourth duration, the first circuit to charge a second device in a second mode; or after the first control apparatus determines that a current value of a circuit is 0, duration in which the detected current value is 0 is fifth duration, and the first control apparatus controls, based on the fifth duration, the first circuit to charge a second device in a third mode.

According to the foregoing implementation, the device can obtain an indication of a charging mode.

According to the third aspect, in a possible implementation, the device includes a first switch and a second switch. The second switch is connected to the first contact and a second control apparatus. The first switch is connected to the first contact and the first circuit. The second switch is connected to the first contact and the first control apparatus. The first control apparatus separately controls the first switch and the second switch to be turned on or off.

According to the foregoing implementation, a charging circuit or a communication circuit is formed by turning different switches on or off.

According to the third aspect, in a possible implementation, after the first control apparatus determines that the current value of the circuit is 0, the first control apparatus controls the third switch to be turned off and the fourth switch to be turned on. The first control apparatus receives first information, and the first information indicates that a second device meets a first condition.

According to the foregoing implementation, a communication circuit is formed by turning different switches on or off to transmit information.

According to the third aspect, in a possible implementation, the first device includes a third switch. The third switch is a bidirectional switch. The third switch is connected to the first circuit and the first control apparatus. The first control apparatus controls the third switch to be connected to the first circuit or the first control apparatus.

According to the foregoing implementation, a charging circuit or a communication circuit is formed by turning different switches on or off.

According to the third aspect, in a possible implementation, after the first control apparatus determines that a current value of the circuit is 0, the first control apparatus controls the third switch to be connected to the first control apparatus. The first control apparatus receives first information. The first information indicates that the second device meets a first condition.

According to the foregoing implementation, a communication circuit is formed by turning different switches on or off to transmit information.

According to the third aspect, in a possible implementation, a first condition is that a voltage between two ends of a first energy storage apparatus in a second device is greater than a second voltage threshold, or less than a first voltage threshold, or greater than a first voltage threshold and less than a second voltage threshold, or equal to a second voltage threshold, or a current value of the second device is greater than a second current threshold, or less than a first current threshold.

According to the foregoing implementation, the device can indicate different circuit statuses based on different information.

According to the third aspect, in a possible implementation, a first device further includes a magnetic field sensor.

The magnetic field sensor is configured to detect whether a second device is connected to the first device.

According to the foregoing implementation, whether the second device is connected to the first device can be determined.

According to a fourth aspect, a device is provided. The device may include a first contact, a second contact, a first energy storage apparatus, a first switch, a first control apparatus, a first voltage measurement apparatus, and a first current measurement apparatus. The first control apparatus is connected to the first voltage measurement apparatus, the first current measurement apparatus, and the first switch. The first voltage measurement apparatus is configured to measure a voltage between two ends of the first energy storage apparatus. The first current measurement apparatus is configured to measure a current in a circuit. The first switch is connected to the first contact and the first energy storage apparatus. The first control apparatus is configured to control, based on a voltage value measured by the first voltage measurement apparatus and/or a current value measured by the first current measurement apparatus, the first switch to be turned on or off. When the first switch is turned on, the first contact is connected to the first energy storage apparatus. When the first switch is turned off, the first contact is disconnected from the first energy storage apparatus.

The first energy storage apparatus may be a battery. The first control apparatus may be a digital circuit, an FPGA, or a micro processing unit (MCU). The first contact and the second contact each may be a Pogo pin, a metal dome, or a USB interface.

According to the technical solution described in the fourth aspect, space of a charged apparatus can be reduced, an energy loss and heat generation in a charging process can be reduced, charging efficiency can be improved, and a charging speed can be increased.

According to the fourth aspect, in a possible implementation, the first voltage measurement apparatus and the first current measurement apparatus are included in the first control apparatus.

According to the foregoing implementation, the control apparatus can measure a voltage and a current.

According to the fourth aspect, in a possible implementation, the first voltage measurement apparatus and the first current measurement apparatus are a first voltage and current measurement apparatus.

According to the foregoing implementation, measurement of a voltage and a current may be completed by one component.

According to the fourth aspect, in a possible implementation, when determining that the first energy storage component is fully charged, the first control apparatus controls the first switch to be turned off.

According to the foregoing implementation, the control apparatus can control the charging process.

According to the fourth aspect, in a possible implementation, if the voltage between the two ends of the first energy storage component exceeds a first voltage threshold and/or a current value exceeds a first current threshold, the first control apparatus controls the first switch to be turned off.

According to the foregoing implementation, when an overvoltage or overcurrent occurs in the charging process, the circuit and the energy storage apparatus can be protected.

According to the fourth aspect, in a possible implementation, when the voltage between the two ends of the first energy storage component exceeds a first voltage threshold, the first control apparatus controls the first switch to be turned off for first duration; and when a current value exceeds a first current threshold, the first control apparatus controls the first switch to be turned off for second duration.

According to the foregoing implementation, the device can control duration during which the switch is turned off, so that another device obtains a circuit status.

According to the fourth aspect, in a possible implementation, when the voltage between the two ends of the first energy storage apparatus is less than a second voltage threshold, the first control apparatus controls the first switch to be turned off for third duration; when the voltage between the two ends of the first energy storage apparatus is greater than a second voltage threshold and less than a third voltage threshold, the first control apparatus controls the first switch to be turned off for fourth duration; or when the voltage between the two ends of the first energy storage apparatus is equal to a third voltage threshold, the first control apparatus controls the first switch to be turned off for fifth duration.

According to the foregoing implementation, the device can control duration during which the switch is turned off, so that another device obtains indication about a charging mode.

According to the fourth aspect, in a possible implementation, the device further includes a second switch. The second switch is connected to the first contact and the first control apparatus. The first control apparatus controls the second switch to be turned on or off.

According to the foregoing implementation, a charging circuit or a communication circuit is formed by turning different switches on or off.

According to the fourth aspect, in a possible implementation, when the device meets a first condition, the first control apparatus controls the first switch to be turned off and the second switch to be turned on. The first control apparatus sends first information. The first information indicates that the device meets the first condition.

According to the foregoing implementation, a communication circuit is formed by turning different switches on or off to transmit information.

According to the fourth aspect, in a possible implementation, the first switch is a bidirectional switch. The first switch is connected to the first energy storage apparatus and the first control apparatus. The first control apparatus controls the first switch to be connected to the first energy storage apparatus or the first control apparatus.

According to the foregoing implementation, a charging circuit or a communication circuit is formed by turning different switches on or off.

According to the fourth aspect, in a possible implementation, when the device meets a first condition, the first control apparatus controls the first switch to be connected to the first control apparatus. The first control apparatus sends first information. The first information indicates that the device meets the first condition.

According to the foregoing implementation, a communication circuit is formed by turning different switches on or off to transmit information.

According to the fourth aspect, in a possible implementation, a first condition is that the voltage between the two ends of the first energy storage apparatus is greater than a first voltage threshold, or less than a first voltage threshold, or greater than a first voltage threshold and less than a first voltage threshold, or equal to a first voltage threshold, or a current value is greater than a first current threshold, or less than a first current threshold.

According to the foregoing implementation, the device can indicate different circuit statuses based on different information.

According to the fourth aspect, in a possible implementation, the device includes a magnetic apparatus. The magnetic apparatus is configured to detect whether the device is connected to a second device.

According to the foregoing implementation, whether the device is connected to the second device can be determined.

It should be understood that descriptions about the technical features, technical solutions, and advantages or similar descriptions in this specification do not indicate that all the features and advantages may be implemented in any single embodiment. In contrast, it may be understood that descriptions about the features or advantages mean that a particular technical feature, technical solution, or advantage is included in at least one embodiment. Therefore, the descriptions about the technical features, technical solutions, or advantages in this specification do not necessarily indicate a same embodiment. Further, the technical features, technical solutions and advantages described in the following embodiments may be combined in any proper manner. A person skilled in the art should understand that an embodiment may be implemented without one or more particular technical features, technical solutions or advantages of a particular embodiment. In other embodiments, an additional technical feature and advantage may be identified in a particular embodiment that does not embody all the embodiments.

BRIEF DESCRIPTION OF THE DRAWINGS

To describe the technical solutions in embodiments of this application more clearly, the following describes the accompanying drawings used in embodiments of this application.

DETAILED DESCRIPTION OF ILLUSTRATIVE EMBODIMENTS

To make the objectives, technical solutions, and advantages of the present invention clearer, the following further describes the implementations of the present invention in detail with reference to the accompanying drawings.

The terms such as "component", "module", "system", and the like used in this application are used to indicate computer-related entities. The computer-related entities may be hardware, firmware, a combination of hardware and software, software, or running software. For example, a component may be, but is not limited to, a process that is run on a processor, a processor, an object, an executable file, a thread of execution, a program, and/or a computer. As an example, both a computing device and an application that runs on the computing device may be components. One or more components may reside within a process and/or a thread of execution, and a component may be located on one computer and/or distributed between two or more computers. In addition, these components may be executed from various computer-readable media that have various data structures. These components may communicate by using a local and/or remote process and according to, for example, a signal having one or more data packets (for example, data from one component that interacts with another component in a local system or a distributed system, and/or interacts with another system via a network such as the Internet by using a signal).

Figure 1:
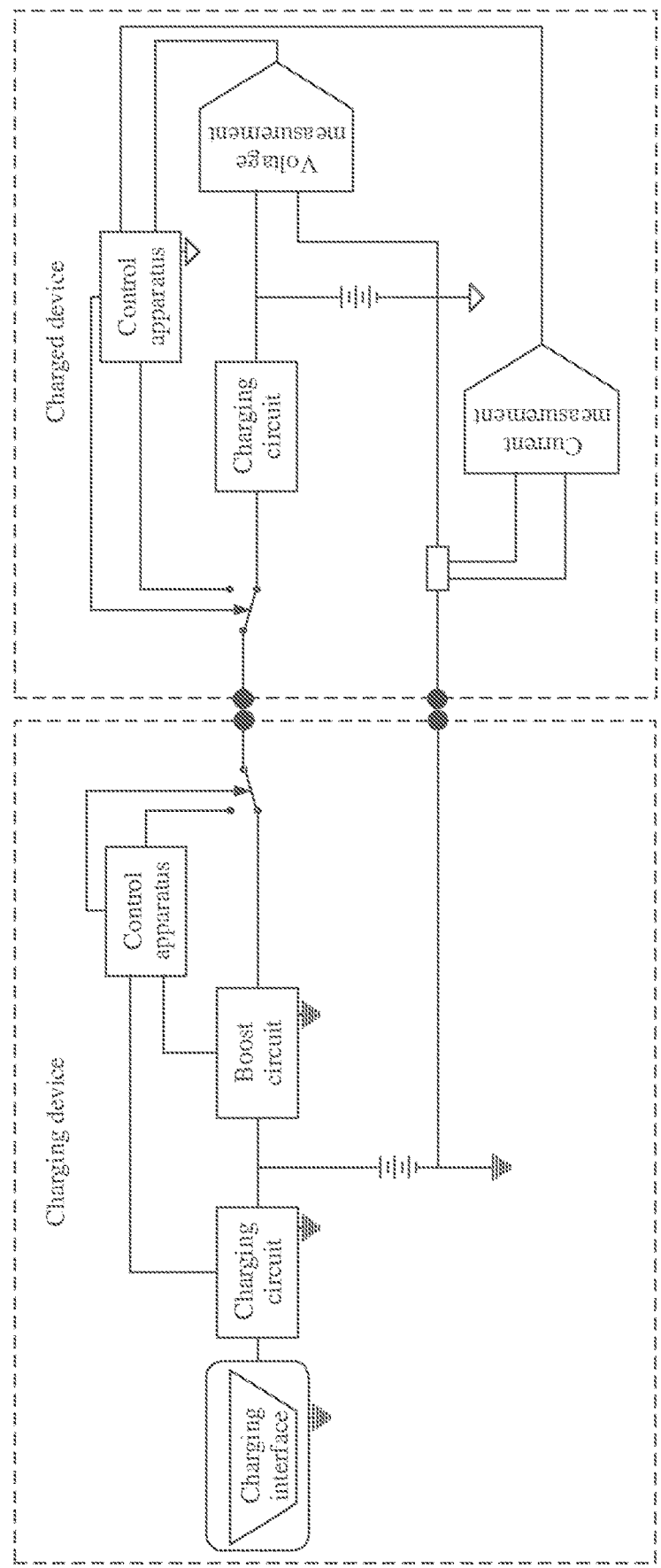
FIG. 1 is a schematic diagram of a charging circuit according to the conventional technology of this application.
Figure 2A:
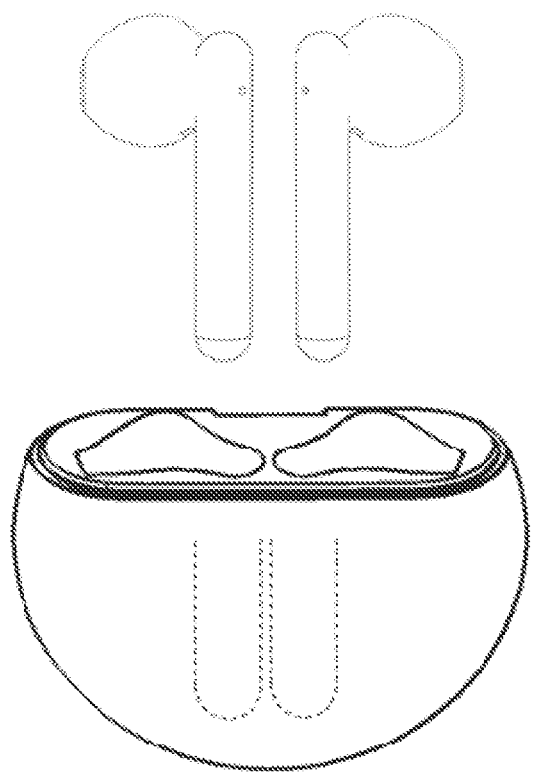
FIG. 2A to FIG. 2C are schematic diagrams of application scenarios of a charging circuit and a charging method according to an embodiment of this application.
Figure 2B:
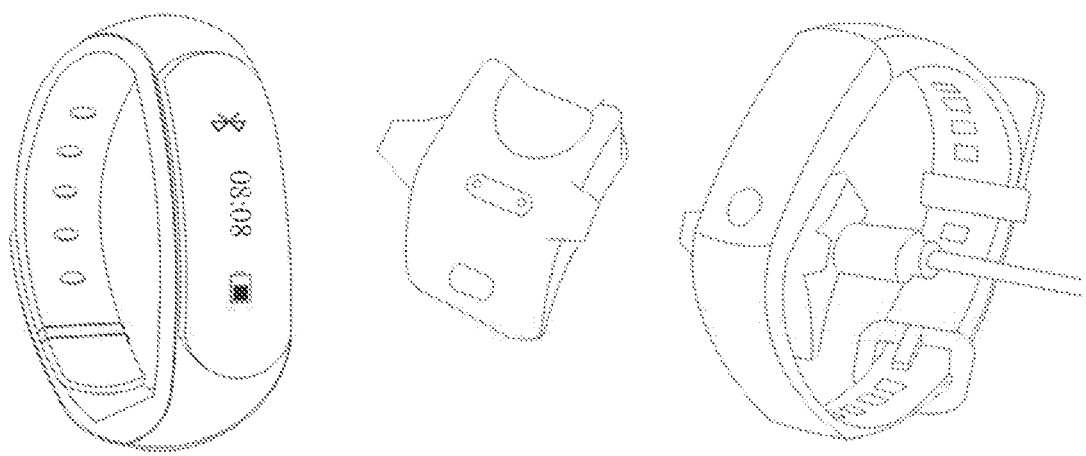
Figure 2C:
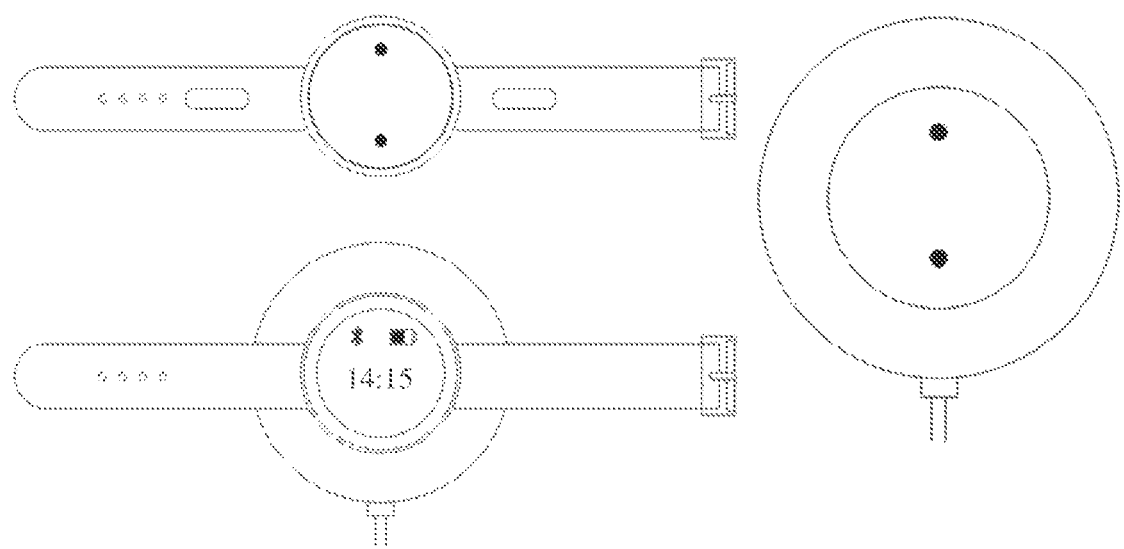

FIG. 2A to FIG. 2C show examples of application scenarios of a charging method according to an embodiment of this application. FIG. 2A shows a Bluetooth headset and a charging case, and the charging case charges the Bluetooth headset. When the Bluetooth headset needs to be charged, the Bluetooth headset may be placed in an accommodating cavity of the charging case, and is electrically connected to the charging case by using two contacts for charging.

FIG. 2B shows a band and a second device. When the band needs to be charged, the band may be connected to the second device, and the second device charges a battery in the band by using a contact. Black dots in the figure are the contacts.

FIG. 2C shows a smartwatch and a second device. When the smartwatch needs to be charged, the smartwatch may be connected to the second device, and the second device charges a battery in the smartwatch by using contacts. Black dots in the figure are the contacts.

It may be understood that the charging method in this embodiment of this application may be applied to another functional electronic terminal that needs to be charged, for example, a wireless mouse, a wireless keyboard, smart glasses, wearable headwear, clothing accessories, and decorative home accessories. In addition, a contact between a charging device and a charged device may be a Pogo pin, or may be a metal dome, a USB interface, or another type of interface. This is not limited in this embodiment.

When the charging device is connected to the charged device by using a contact, the charging device may charge the charged device by using the contact, or the two devices may transmit information by using the contact. For example, the charged device upgrades a system of the charging device.

Figure 3:
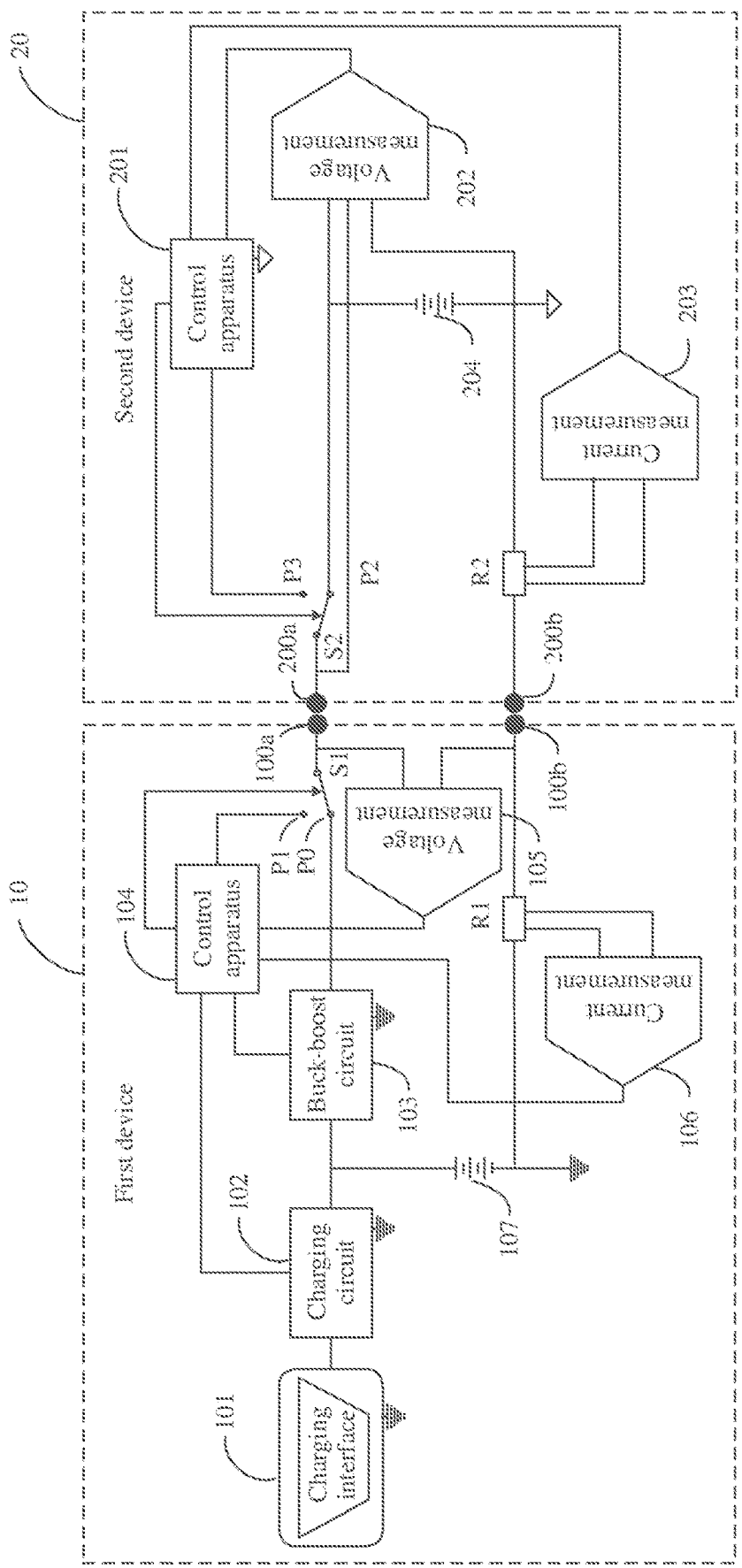
FIG. 3 is a schematic diagram of a charging circuit according to an embodiment of this application.

FIG. 3 shows an example of a structure of a charging system according to an embodiment of this application. As shown in FIG. 3, the charging system includes a first device 10 and a second device 20. The first device 10 has contacts 100*a* and 100*b*, and the second device 20 has contacts 200*a* and 200*b*. To perform charging, the contacts of the first device 10 are electrically connected to the contacts of the second device 20. In other words, the contact bow is connected to the contact 200*a*, and the contact mob is connected to the contact 200*b*. The first device 10 may be a charging apparatus, and the second device 20 may be a charged apparatus.

The first device 10 may include a charging interface 101, a buck-boost charging circuit 103, a control apparatus 104, a voltage measurement apparatus 105, a current measurement apparatus 106, a resistor R1, and a switch S1.

The charging interface 101 is configured to connect to an external power supply. In some embodiments, the external power supply may be a 5 V/12 V power supply that is converted from a 100 V to 240 V alternating current voltage, or may be a device, for example, a mobile power supply, that can charge another electronic device. The charging interface 101 may be an interface of a type such as USB, Mini USB, Micro USB, USB Type-C or Lightning. It may be understood that the external power supply and the charging interface may be of another type. For example, for a power supply that supports fast charging, an alternating current voltage may be converted into 24 V. This is not limited in this embodiment.

The voltage measurement apparatus 105 is configured to measure a voltage at an output end of the first device 10.

The current measurement apparatus 106 is configured to measure a current output by a charging circuit.

The resistor R1 is configured to provide impedance, so that the current measurement apparatus 106 can measure the current based on the impedance. In some embodiments, as shown in FIG. 3, the resistor R1 may be located near a grounding point. In some other embodiments, the resistor R1 may alternatively be located near an output end, for example, between the switch S1 and the contact 100*a*.

The control apparatus 104 is configured to receive measured values of the voltage measurement apparatus 105 and the current measurement apparatus 106, and control the buck-boost charging circuit 103 and the control switch S1. In some embodiments, the control apparatus 104 may periodically send a signal to the voltage measurement apparatus 105 and the current measurement apparatus 106. The signal is used to allow the voltage measurement apparatus 105 and the current measurement apparatus 106 to report a voltage value and a current value to the control apparatus 104. In some embodiments, the control apparatus 104 may be a digital circuit, an FPGA, or a micro control unit (MCU).

The buck-boost charging circuit 103 is configured to step up or down a voltage at an output end, to charge the second device 20. In some embodiments, an output voltage of the buck-boost charging circuit 103 may be 3.2 V to 5 V. When the first device 10 and/or the second device 20 include/ includes a single battery, the buck-boost charging circuit 103 may be a buck charging circuit. For example, if the second device 20 includes only a single battery, and a charging cutoff voltage of the battery is 40.2 V, an input voltage of the buck-boost charging circuit 103 is 5 V. Because only a voltage step-down operation needs to be performed, the buck-boost charging circuit 103 may be the buck charging circuit. If the second device 20 includes two batteries, and the two batteries are connected in series, a charging cutoff voltage of the two batteries connected in series reaches 8.4 V. In this case, the buck-boost charging circuit needs to perform a voltage step-up operation.

In some other embodiments, the first device 10 may include a charging circuit 102 and a battery 107. When the first device 10 is not connected to the second device 20, but the charging interface 101 is connected to the external power supply, the first device 10 charges the battery 107 by using the charging circuit 102. When the charging interface 101 is not connected to the external power supply, but the first device 10 is connected to the second device 20, the battery 107 charges the second device 20 by using the buck-boost charging circuit 103.

In some other embodiments, the voltage measurement apparatus 105 and the current measurement apparatus 106 may be independent apparatuses, for example, analog-to-digital converters (ADCs), or may be integrated into one apparatus, or may be included in the charging circuit 102 or the control apparatus 104.

The second device 20 may include a switch S2, a control apparatus 201, a voltage measurement apparatus 202, a current measurement apparatus 203, a battery 204, and a resistor R2.

The voltage measurement apparatus 202 is configured to measure a voltage of the battery 204 and an input voltage of a contact.

The current measurement apparatus 203 is configured to measure a current that enters the battery 204 during charging.

The resistor R2 is configured to provide impedance, so that the current measurement apparatus 203 can measure the current based on the impedance.

The control apparatus 201 is configured to receive measured values of the voltage measurement apparatus 202 and the current measurement apparatus 203, and control the switch S2 based on the measured values. In some embodiments, the control apparatus 201 may periodically send a signal to the voltage measurement apparatus 202 and the current measurement apparatus 203. The signal enables the voltage measurement apparatus 202 and the current measurement apparatus 203 to report a voltage value and a current value to the control apparatus 201. In some embodiments, the control apparatus 201 may be a digital circuit, an FPGA, or a micro control unit (MCU).

In some other embodiments, the voltage measurement apparatus 202 and the current measurement apparatus 203 may be independent apparatuses, for example, analog-to-digital converters (ADCs), or may be integrated into one apparatus, or may be included in the control apparatus 201.

The switches S1 and S2 are configured to implement switching between a charging circuit and a communication circuit. When the contacts of the first device 10 are electrically connected to that of the second device 20, an entire circuit separately forms the charging circuit and the communication circuit through switching of the switches S1 and S2. Specifically, when the switch S1 is connected to P0, and the switch S2 is connected to P2, the charging circuit is formed between the first device 10 and the second device 20. In this case, the first device 10 charges the second device 20. When the switch S1 is connected to P1 and the switch S2 is connected to P3, the communication circuit is formed between the first device 10 and the second device 20. In this case, information transmission may be performed between the first device 10 and the second device 20.

In some embodiments, an initial state of the switch S1 may be a connection to P0, or may be a connection to P1, and an initial state of the switch S2 may be a connection to P2, or may be a connection to P3.

In some other embodiments, the current measurement apparatuses 106 and 203 may obtain a current by measuring a voltage carried on a resistor, or by using a Hall effect sensor or in another manner of measuring a current.

In some other embodiments, the current measurement apparatus 106 and 203 may measure a current at an output end of a power supply by using a resistor, or may measure a current at a grounding end.

In some other embodiments, the first device 10 may include a magnetic field sensor, the magnetic field sensor is connected to the control apparatus 104, and the second device 20 may include a magnet. After the second device 20 is connected to the first device 10, the magnet approaches the magnetic field sensor. The magnetic field sensor detects a change of a magnetic field, and sends a trigger signal to the control apparatus 104. The trigger signal indicates that the first device 10 is already connected to the second device 20.

In some embodiments, the magnetic field sensor may be a Hall effect sensor, or may be a magnetic field sensor of another type.

In some other embodiments, the first device 10 may include an optical sensor. The optical sensor is configured to determine whether the first device 10 is connected to the second device 20. It may be understood that the first device 10 may determine, in another manner, whether the first device 10 is connected to the second device 20. This is not limited in this embodiment of this application.

According to the foregoing structure, a charging circuit is removed from the charged apparatus, so that space is reduced. In the charging apparatus, a fixed boost circuit is changed to a buck-boost charging circuit, so that an entire circuit does not need to undergo two processes of voltage step-up and voltage step-down in a charging process. This improves charging efficiency, reduces an energy loss and heat generation in the charging process, and increases a charging speed.

Figure 4:
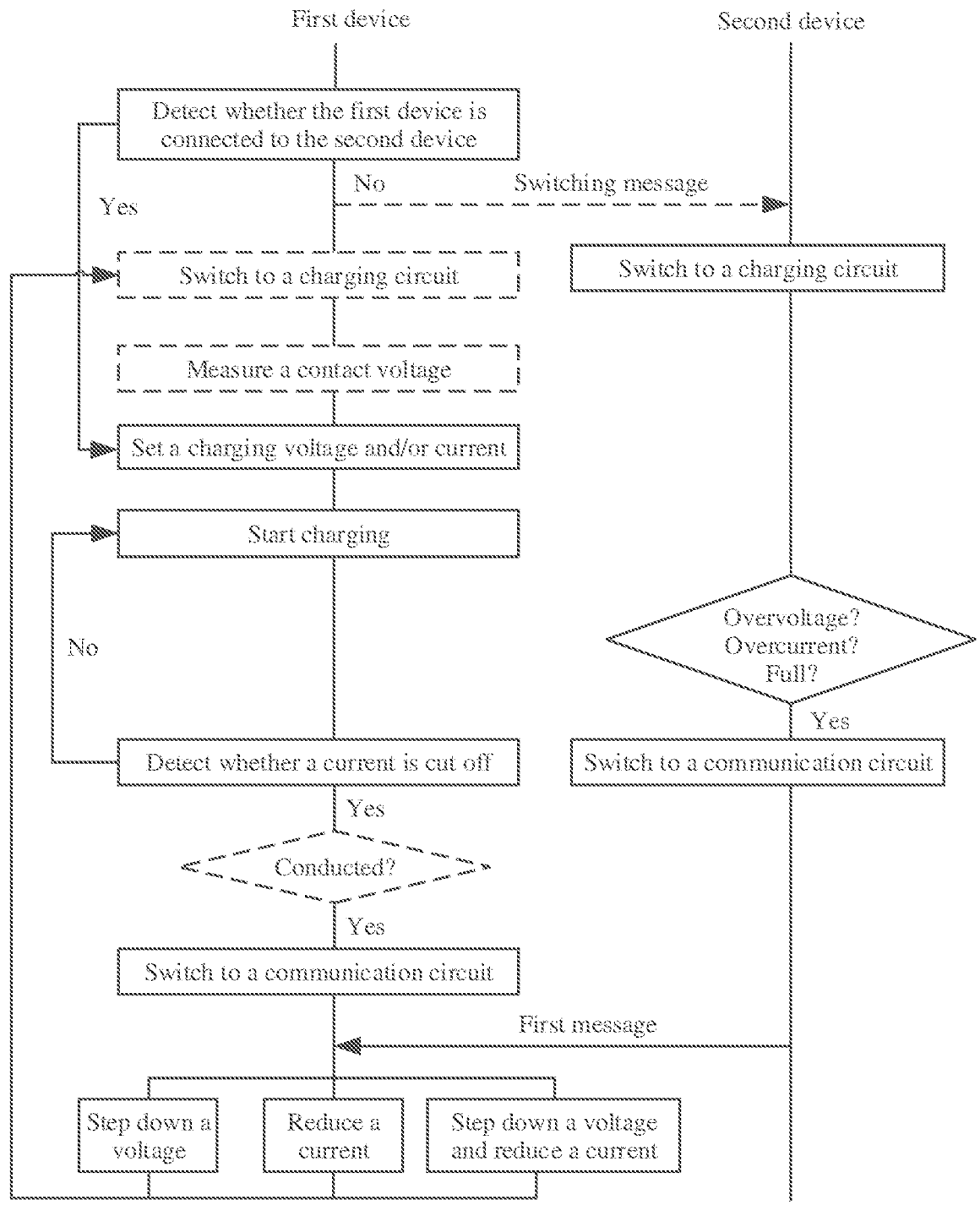
FIG. 4 is a charging method according to an embodiment of this application.

Based on the foregoing structure, the first device 10 and the second device 20 are charged by using the method steps shown in FIG. 4.

S101: The first device 10 detects whether the second device 20 is connected to the first device 10. In some embodiments, the first device 10 may perform detection by using a magnetic field sensor or an optical sensor. Details are not described herein again. In some other embodiments, when initial states of the switches S1 and S2 indicate that the charging circuit is connected, the first device 10 may detect a voltage of a contact by using the voltage measurement apparatus 105, to determine whether the second device 20 is connected to the first device 10.

When initial states of the switches S1 and S2 indicate that the communication circuit is formed, the first device 10 performs steps S102 and S103; otherwise, the first device 10 performs step S104.

S102: The first device 10 indicates the second device 20 to switch to the charging circuit. Specifically, the control apparatus 104 of the first device 10 sends a switching message to the control apparatus 201 of the second device 20. The switching message indicates the control apparatus 201 to switch the switch S2 to the charging circuit. The switching message may be signaling that complies with a communication protocol, for example, the 1-wire protocol, or may be a pulse signal. After receiving the switching message, the control apparatus 201 of the second device 20 controls the switch S2 to switch to the charging circuit.

S103: The first device 10 switches to the charging circuit. Specifically, the control apparatus 104 of the first device 10 controls the switch S1 to switch to the charging circuit.

S104: The first device 10 measures a voltage of the battery 204 of the second device 20. Specifically, after charging circuits of the first device 10 and the second device 20 are on, the battery 204 of the second device 20 is directly connected to the charging circuit of the first device 10 by using the switch S2 and a contact. Correspondingly, the voltage of the battery 204 is also fed back to the charging circuit of the first device 10. The first device 10 measures a voltage between the contacts low and mob by using the voltage measurement apparatus 105.

S105: The first device 10 sets a charging voltage and/or a charging current. Specifically, the first device 10 controls, based on the voltage value measured in step S104, the buck-boost charging circuit 103 to perform a voltage step-up operation or voltage step-down operation. If an input voltage of the buck-boost charging circuit 103 is greater than the measured voltage value, the control apparatus 104 controls the buck-boost charging circuit 103 to perform the voltage step-down operation. If an input voltage is lower than the measured voltage value, the control apparatus 104 controls the buck-boost charging circuit 103 to perform the voltage step-up operation. The input voltage may be measured by the buck-boost charging circuit 103.

In some embodiments, the control apparatus 104 of the first device 10 may set the charging voltage and/or the charging current based on different charging modes. The charging mode may be constant current charging, constant voltage charging, pulse charging, or the like.

In some embodiments, the control apparatus 104 may compensate the charging voltage in advance based on impedance in the charging circuit. Because the switches, a line, and the contacts all bring impedance, the first device 10 may compensate the charging voltage, to increase a charging speed. Specifically, if a sum of impedance in a circuit is R, the charging voltage may be increased by $\Delta v = I \times R$. If a target charging voltage of the second device is $V_{ev}$, the charging voltage set by the control apparatus 104 may be $V = V_{ev} + I \times R$. In the formula, I indicates the charging current, and may be obtained by the current measurement apparatus 106; and a value of R may be preset in the control apparatus 104 of the first device 10, or may be obtained through measurement. Specifically, the first device 10 charges the second device 20 by using a first current having a fixed value (for example, 1 A), and the voltage value of the output end of the first device and a voltage between two ends of the battery 204 are separately obtained by using the voltage measurement apparatuses 105 and 202. Because a voltage variation value $\Delta v$ is caused by path impedance, impedance R in the charging circuit may be obtained by using the voltage variation value $\Delta v$.

S106: The first device 10 starts to charge the second device 20. In a charging process, the first device 10 may select different charging modes for charging. Specifically, the charging mode may be constant current charging, constant voltage charging, pulse charging, or the like.

S107: If the first device 10 detects that the current value changes to 0, the first device 10 may perform step S108; otherwise, return to S106. In some other embodiments, after detecting that the current value changes to 0, the first device 10 detects whether the second device 20 remains connected to the first device 10. If the second device 20 remains connected to the first device 10, the first device 10 performs step S108.

That the current value changes to 0 may be caused by one of the following reasons.

A: The second device 20 is disconnected from the first device 10.

B: Because an overvoltage and/or overcurrent occurs on the second device 20, the switch S2 is switched to the communication circuit. In this case, the charging circuit is disconnected. The overvoltage means that the voltage between the two ends of the battery 204 exceeds a first voltage threshold, and the overcurrent means that the current value of the circuit exceeds a first current threshold. The first voltage threshold and the first current threshold are preset values. The first voltage threshold may be a rated voltage or a charging cutoff voltage of the battery 204, and the first current threshold may be a rated current of the battery 204.

C: The second device 20 is fully charged, and the switch S2 is switched to the communication circuit. In this case, the charging circuit is disconnected.

The first device 10 may determine, by using a magnetic sensor or an optical sensor, whether the second device 10 remains connected to the first device 10. If it is determined that the current is cut off due to a reason A, the first device 10 may keep a state of the switch S1 unchanged, or the control apparatus 104 restores the switch S1 to the initial state of the switch S1.

Specifically, the first device 10 determines, by using the current measurement apparatus 106, that the current value changes to 0, and the control apparatus 104 obtains the current value κ from the current measurement apparatus 106. In some other embodiments, when determining that the current value is 0, the current measurement apparatus 106 sends cut-off indication information to the control apparatus 104, to indicate that the current value changes to 0.

S108: The first device 10 switches the switch S1 to connect the communication circuit. Specifically, the control apparatus 104 of the first device 10 controls the switch S1 to switch to the communication circuit.

S109: The first device 10 obtains a first message from the second device 20, where the first message indicates a reason why the current value changes to 0, for example, the overvoltage, the overcurrent, or full charge. When the first device 10 switches to the communication circuit, it can be learned from step S107 that when the reasons B and C occur, the communication circuit of the second device 20 is already connected. Therefore, the communication circuit between the first device 10 and the second device 20 is connected, so that information can be transmitted. The control apparatus 104 of the first device 10 receives the first message from the control apparatus 201 of the second device 20. The first message may be signaling that complies with a communication protocol, for example, the i-wire protocol, or may be a pulse signal. If the first message indicates that the reason why the current value is 0 is overvoltage, the first device 10 performs step S110. If the first message indicates that the reason why the current value is 0 is overcurrent, the first device 10 performs step S111. If the first message indicates both overvoltage and overcurrent, the first device 10 performs step S112. If the first message indicates full charge, the first device 10 may keep the state of the switch S1 unchanged, or the control apparatus 104 may restore the switch S1 to the initial state.

S110: The control apparatus 104 of the first device 10 controls the buck-boost charging circuit 103 to step down the charging voltage. The first device 10 performs step S102 to restore the charging process. In some embodiments, the first device 10 may step down the charging voltage in a step-by-step manner. Specifically, the first device 10 may step down a first voltage (for example, 0.1 V), and then perform step S102. If the switch S2 of the second device 20 is still turned off due to the overvoltage, the first device 10 steps down a second voltage. The first voltage and the second voltage may be the same. The first device 10 may step down the charging voltage in another manner. This is not limited in this embodiment.

S111: The controller 104 of the first device 10 controls the buck-boost charging circuit 103 to reduce the charging current. The first device 10 performs step S102 to restore the charging process. In some embodiments, the first device 10 may reduce the charging current in a step-by-step manner. Specifically, the first device 10 may reduce a first current, and then perform step S102. If the switch S2 of the second device 20 is still turned off due to the overcurrent, the first device 10 reduces a second current. The first current and the second current may be the same. The first device 10 may also reduce the charging current in another manner. This is not limited in this embodiment.

S112: The controller of the first device 10 steps down the charging voltage and reduces the charging current. For a method for stepping down the charging voltage and the charging current, refer to steps S110 and S111. Details are not described herein again. The first device 10 performs step 102 to restore the charging process.

According to the foregoing charging method, the charging process is controlled by the first device, and a charging circuit of the second device is simplified. In addition, only one voltage step-up process or voltage step-down process is needed in the charging process, so that a charging efficiency loss is relatively small, heat generated in the charging process is relatively small, and the charging speed is increased.

The voltage measurement apparatus 202 and the current measurement apparatus 203 in the second device 20 are mainly configured to ensure safety in the charging process. Specifically, in the charging process, the second device 20 measures the voltage of the battery 204 by using the voltage measurement apparatus 202, and sends the voltage value to the control apparatus 201; and the second device 20 measures a current in the charging circuit by using the current measurement apparatus 203, and sends the current value to the control apparatus 201. When the voltage exceeds the first voltage threshold and/or the current exceeds the first current threshold, the control apparatus 201 controls the switch S2 to switch to the communication circuit. In other words, the charging circuit is disconnected, so that safety in the charging process is ensured. In some other embodiments, the voltage measurement apparatus 202 may determine whether the voltage value exceeds the first voltage threshold. When the voltage value exceeds the first voltage threshold, the voltage measurement apparatus 202 sends the first indication information to the control apparatus 201, to indicate that the voltage value exceeds the first voltage threshold. The current measurement apparatus 203 may determine whether the current value exceeds the first current threshold. When the current value exceeds the first current threshold, the current measurement apparatus 203 sends second indication information to the control apparatus 201, to indicate that the current value exceeds the first current threshold. After receiving the first instruction information and/or the second instruction information, the control apparatus 201 controls the switch S2 to disconnect the charging circuit and switch to the communication circuit. In addition, the control apparatus 201 determines a current status based on the received first indication information and/or second indication information. The first indication information and the second indication information each may be signaling that complies with a communication protocol, for example, the 1-wire protocol, or may be a pulse signal.

In addition, the second device 20 may measure the voltage and current of the battery 204 of the second device 20 by using the voltage measurement apparatus 202 and the current measurement apparatus 203. If the voltage reaches a second voltage threshold, and the current value is less than a second current threshold, it is determined that the battery 204 is fully charged. In some embodiments, after it is determined that the battery 204 is fully charged, the control apparatus 201 may control the switch S2 to disconnect the charging circuit and switch to the communication circuit. In some embodiments, the second voltage threshold may be a preset value, for example, may be a cutoff voltage of the battery 204, for example, 4.2 V. The second current threshold may be a preset value, for example, 100 mA.

The control apparatus 201 generates the first message, and sends the first message to the control apparatus 104 of the first device 10 after the communication circuit between the first device 10 and the second device 20 is connected.

In some embodiments, the first voltage threshold, the first current threshold, the second voltage threshold, and the second current threshold may be stored in the control apparatus 201, or may be separately stored in the voltage measurement apparatus 202 and the current measurement apparatus 203.

In the foregoing process, the charging apparatus and the charged apparatus can disconnect a circuit based on a change of a circuit status and a battery status, to ensure safety of the circuit and the battery. In addition, the charging apparatus and the charged apparatus can communicate timely, transmit the circuit status and the battery status, and regulate a voltage and/or a current based on a status change.

Figure 5:
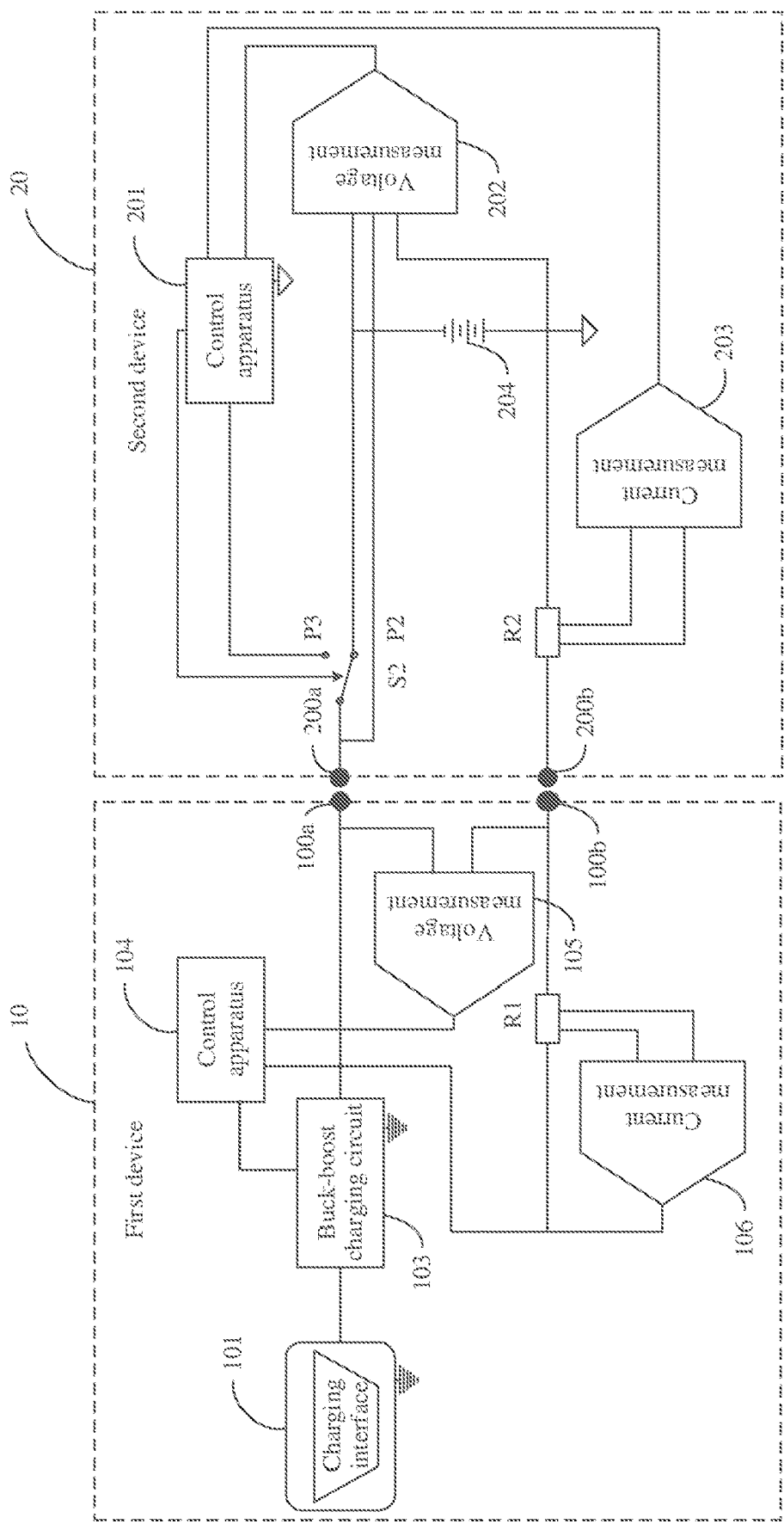
FIG. 5 is a schematic diagram of another charging circuit according to an embodiment of this application.

FIG. 5 shows an example of another charging circuit according to an embodiment of this application.

FIG. 5 and FIG. 3 mainly differs in a first device 10. The first device 10 may include a charging interface 101, a buck-boost charging circuit 103, a control apparatus 104, a voltage measurement apparatus 105, a current measurement apparatus 106, and a resistor R1.

A second device 20 may include a switch S2, a control apparatus 201, a voltage measurement apparatus 202, a current measurement apparatus 203, a battery 204, and a resistor R2.

For functions of the components, refer to descriptions of the components in FIG. 3. Details are not described herein again.

In some other embodiments, the first device 10 may include a magnetic field sensor or an optical sensor, configured to determine whether the first device 10 is connected to the second device 20.

Figure 6:
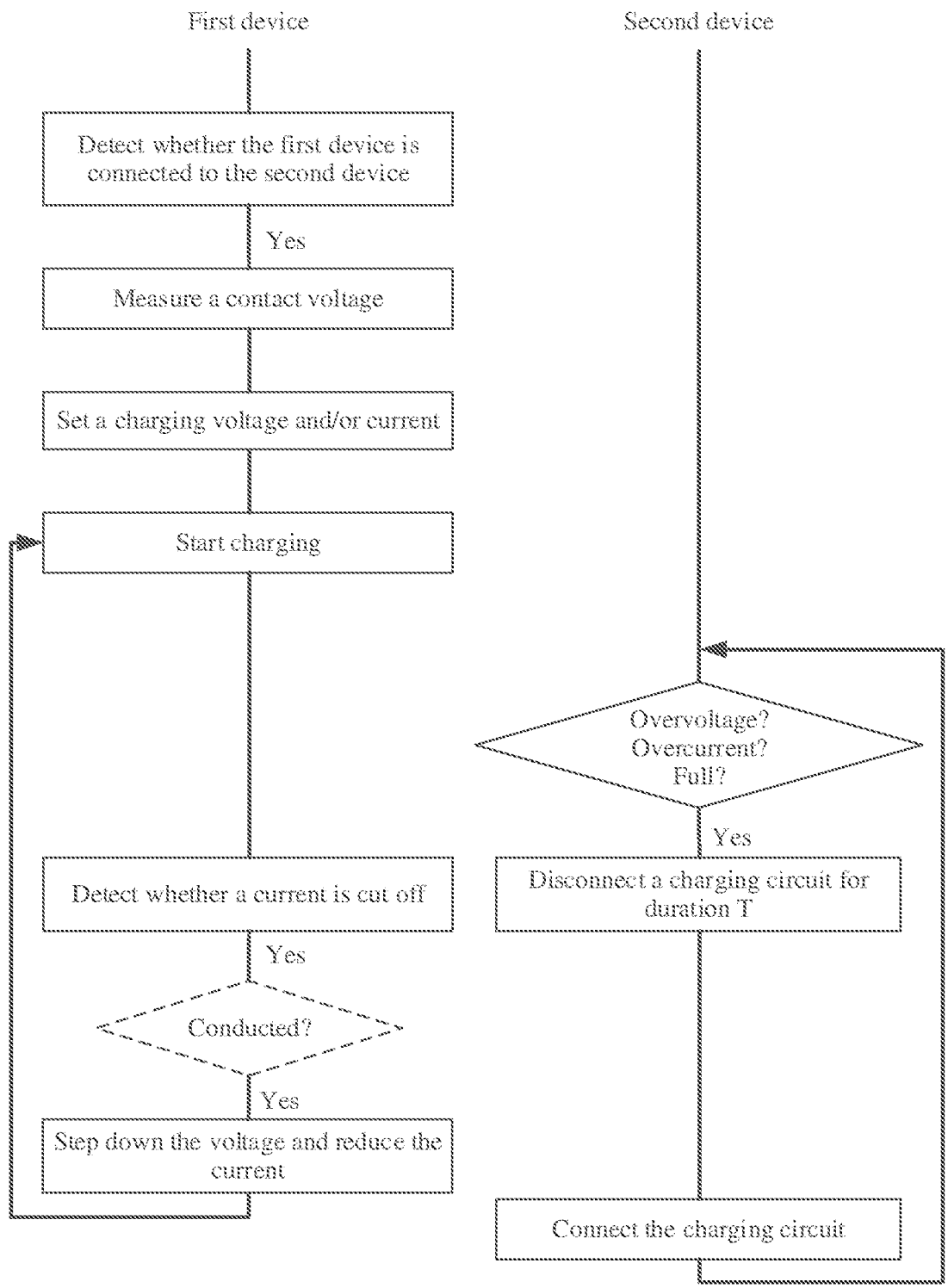
FIG. 6 is another charging method according to an embodiment of this application.

In the circuit shown in FIG. 5, there is no communication circuit between the first device 10 and the second device 20. Therefore, a structure of the circuit is further simplified. An initial state of the switch S2 of the second device may be connection to P2. In other words, a charging circuit is connected. Specifically, the first device 10 and the second device 20 are charged by using the method steps shown in FIG. 6.

S201: The first device 10 detects whether the second device 20 is connected to the first device 10. Specifically, the first device 10 may determine, by using the magnetic field sensor or the optical sensor, whether the second device 20 is connected to the first device 10, or may determine, by using a voltage value that is not 0 and that is detected by the voltage measurement apparatus 105, that the second device 20 is connected to the first device 10.

S202: The first device 10 measures a voltage of the battery 204 of the second device 20. For details of this step, refer to step S104. Details are not described herein again.

S203: The first device 10 sets a charging voltage and/or a charging current. For details of this step, refer to step S105. Details are not described herein again.

S204: The first device 10 starts to charge the second device 20. For details of this step, refer to step S106. Details are not described herein again.

S205: If the first device 10 detects that a current value changes to 0, the first device 10 may perform step S206; otherwise, return to S204. In some other embodiments, after detecting that the current value changes to 0, the first device 10 detects whether the second device 20 remains connected to the first device 10. If the second device 20 remains connected to the first device 10, the first device 10 performs step S206. For a reason why the current value changes to 0, refer to step S107.

S206: The first device 10 steps down the charging voltage and/or reduces the charging current, and waits for the charging circuit to be connected again, and then the first device performs step S204.

In this step, the reason why the current value changes to 0 may be B or C in step S107. For a reason C, that is, when the battery is fully charged, the charging circuit is not be connected again. For the reason B, the first device may step down the charging voltage and/or reduce the charging current, and continue charging after the charging circuit is connected again.

For a method for stepping down the charging voltage and/or the charging current, refer to steps S109, S110, and S111. Details are not described herein again.

The voltage measurement apparatus 202 and the current measurement apparatus 203 in the second device 20 are mainly configured to ensure safety in a charging process. For a step in which the control apparatus 201 determines current statuses of the circuit and the battery by using the voltage measurement apparatus 202 and the current measurement apparatus 203, refer to FIG. 4. Details are not described herein again.

When determining that an overvoltage, an overcurrent, or a full charge occurs, the control apparatus 201 controls the switch S2 to disconnect the charging circuit and switch to the communication circuit. When the overvoltage and/or overcurrent occurs, the control apparatus 201 may wait for a time t after the charging circuit of the second device 20 is disconnected. In this time period, the first device 10 can detect that a current is cut off, step down the charging voltage and/or reduce the charging current, and wait for the charging circuit to be connected again. After the waiting time T, the control apparatus 201 of the second device 20 controls the switch S2 to switch to the charging circuit, and the first device 10 continues to charge the second device 20. When the full charge occurs, the control apparatus 201 controls the switch S2 to remain in an off state from the charging circuit until the second device 20 detects that a voltage drops to a third voltage threshold. Then, the control apparatus 201 controls the switch S2 to switch from the communication circuit to the charging circuit, so that the first device 10 continues to charge the second device 20. The third voltage threshold is a preset value, and may be stored in the control apparatus 201, or may be stored in the voltage measurement apparatus 202.

According to the foregoing circuit and charging method, a circuit structure of the charging apparatus is further simplified, and the charging apparatus does not need to communicate with the charged apparatus, so that charging efficiency is further improved.

Figure 7:
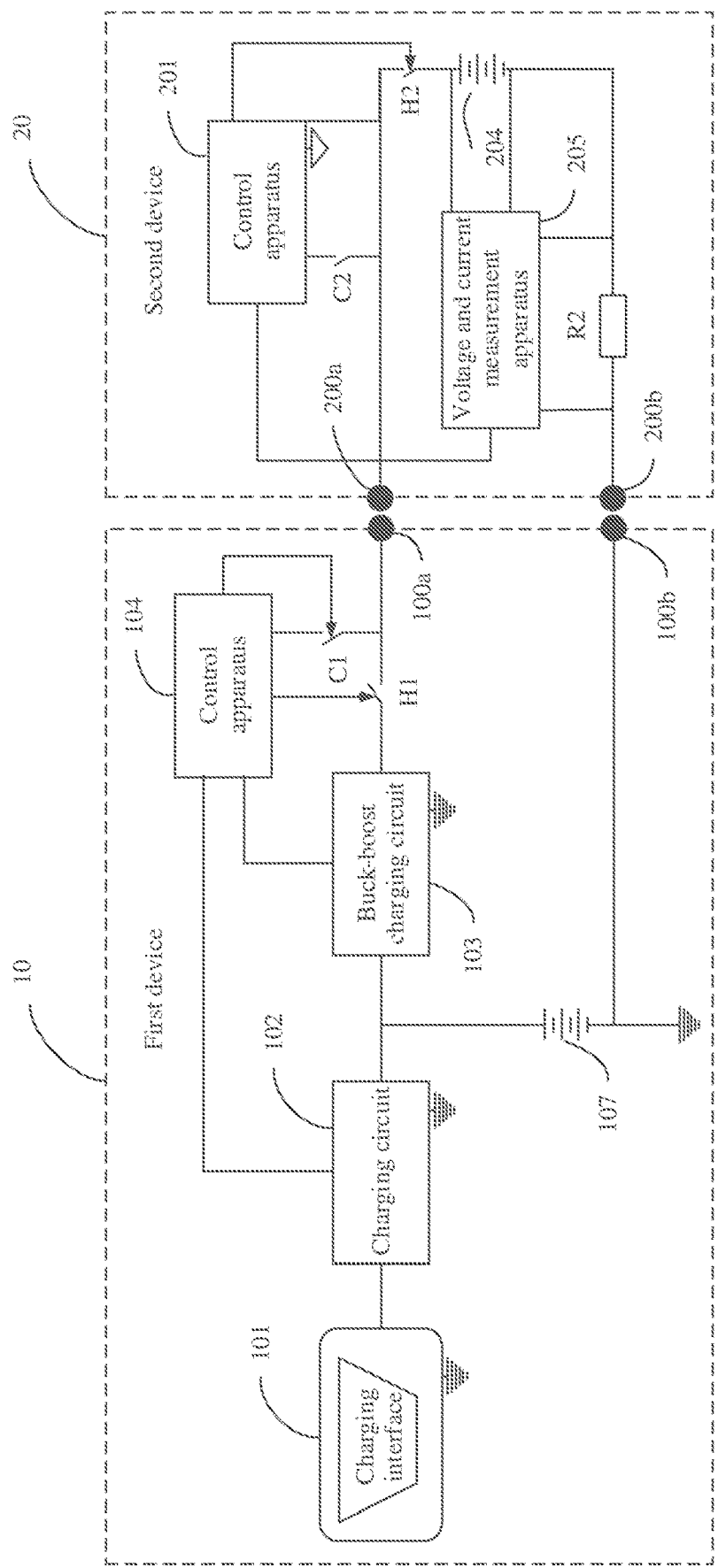
FIG. 7 is a schematic diagram of still another charging circuit according to an embodiment of this application.

FIG. 7 shows an example of another charging circuit according to an embodiment of this application.

A first device 10 may include a charging interface 101, a buck-boost charging circuit 103, a control apparatus 104, and contacts 100a and 100b.

In some other embodiments, the first device 10 may include a charging circuit 102 and a battery 107. When the first device 10 is not connected to a second device 20 but the charging interface 101 is connected to an external power supply, the first device 10 charges the battery 107 by using the charging circuit 102. When the charging interface 101 is not connected to the external power supply but the first device 10 is connected to the second device 20, the battery 107 charges the second device 20.

The second device 20 may include a control apparatus 201, a battery 204, a voltage and current measurement apparatus 205, a resistor R2, contacts 200a and 200b, and a switch H2.

The voltage and current measurement apparatus 205 is configured to measure a voltage between two ends of the battery 204 and a current of a circuit when the second device 20 is charged. For other components, refer to FIG. 3. Details are not described herein again.

The switch H2 is configured to control a charging circuit in the second device 20 to be connected or disconnected.

In some embodiments, the voltage and current measurement apparatus 205 may be an independent voltage measurement apparatus and an independent current measurement apparatus, or may be integrated into the control apparatus 201.

Figure 8:
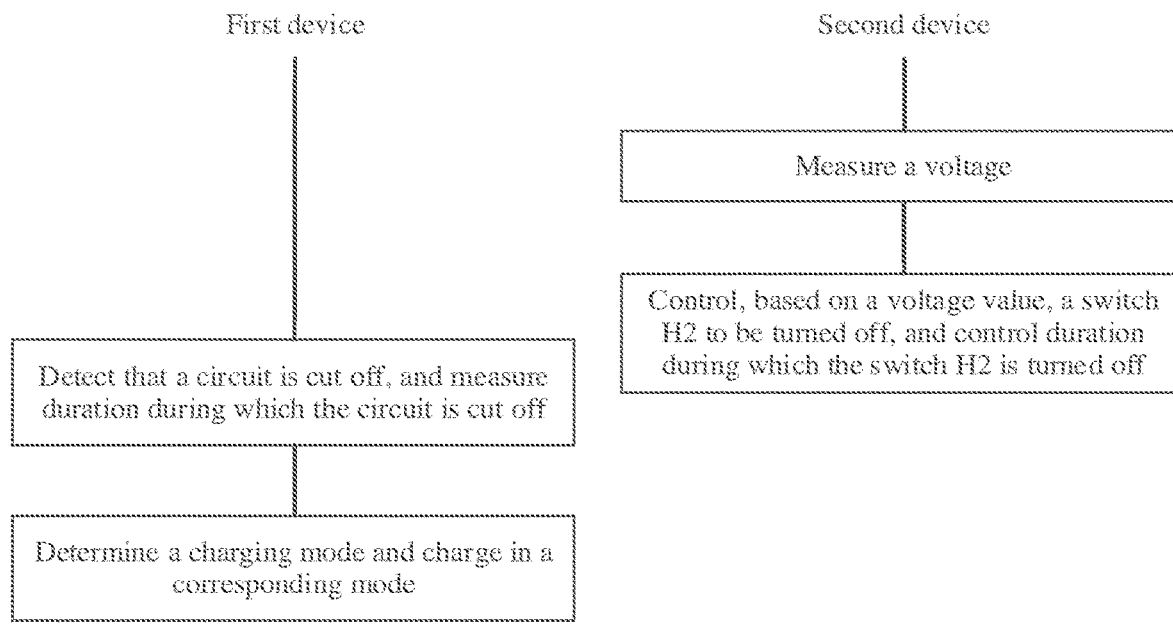
FIG. 8 is still another charging method according to an embodiment of this application.
Figure 9:
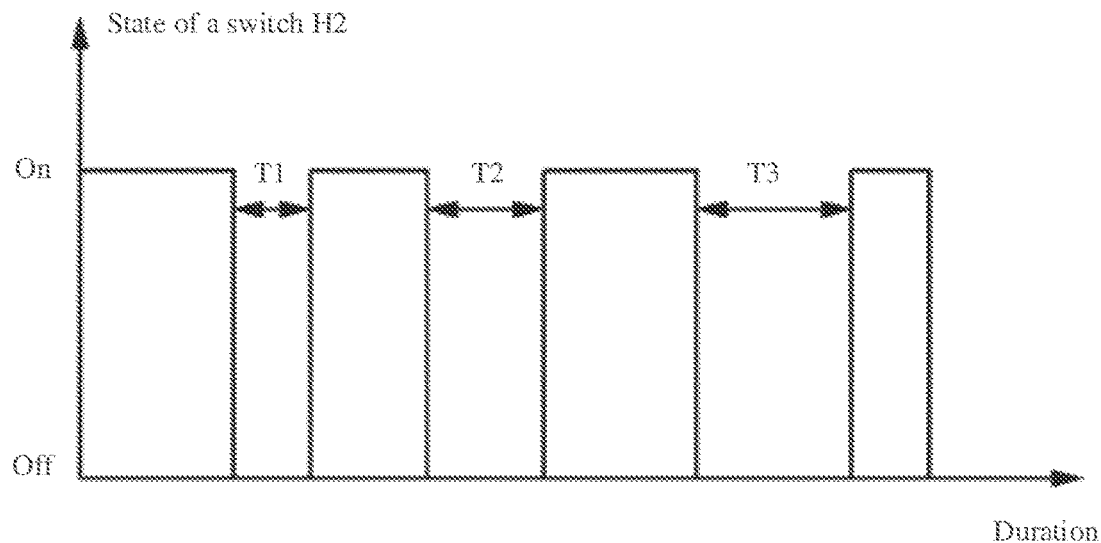
FIG. 9 is a schematic diagram of controlling a state of a switch and off duration according to an embodiment of this application.

Based on the charging circuit shown in the figure, an embodiment of this application provides a charging method. As shown in FIG. 8 and FIG. 9, the second device 20 transfers charging mode information to the first device 10 by controlling the switch H2 to be turned off and by controlling duration during which the switch H2 is turned off. The charging method includes the following method steps.

S301: When H2 is in an on state, the first device 10 and the second device 20 each are in a charging state. The voltage and current measurement apparatus 205 of the second device 20 measures the voltage between the two ends of the battery 204, and feeds back a voltage value to the control apparatus 201.

S302: The second device 20 controls, based on the voltage value measured by the voltage and current measurement apparatus 205, the switch H2 to enter an off state, and duration during which the switch H2 remains in the off state. Specifically, the control apparatus 201 controls, based on the measured voltage value, the switch H2 to enter the off state, and duration during which the switch H2 remains in the off state. The first device 10 determines a charging mode based on duration during which a current is cut off. In some embodiments, the charging mode may include a trickle charging mode, a constant current charging mode, a constant voltage charging mode, and the like.

Specifically, when the voltage value of the battery 204 measured by the voltage and current measurement apparatus 205 is less than a fourth voltage threshold, the control apparatus 201 controls the switch H2 to change from the on state to the off state. In this case, the current of the first device 10 is cut off, and the control apparatus 104 of the first device 10 starts timing. When the control apparatus 201 of the second device 20 controls the switch H2 to remain in the off state for T1, the control apparatus 201 controls the switch H2 to change from the off state to the on state. In this case, the current of the first device 10 is conducted, the control apparatus 104 of the first device 10 determines that duration for which the current is cut off is T1, and the control apparatus 104 of the first device 10 can control the charging circuit to enter the trickle charging mode. The trickle charging mode allows restorative charging of a fully discharged battery. In the trickle charging mode, a charging current may be a constant current, and a value of the charging current may be less than a rated charging current, for example, 1/10 of the rated charging current. The fourth voltage threshold is a preset voltage value, for example, 3 V.

When the voltage value of the battery 204 measured by the voltage and current measurement apparatus 205 is between the fourth voltage threshold and a fifth voltage threshold, the control apparatus 201 controls the switch H2 to change from the on state to the off state. In this case, the current of the first device 10 is cut off, and the control apparatus 104 of the first device 10 starts timing. When the control apparatus 201 of the second device 20 controls the switch H2 to remain in the off state for duration T2, the control apparatus 201 controls the switch H2 to change from the off state to the on state. In this case, the current of the first device 10 is conducted, the control apparatus 104 of the first device 10 determines that duration for which the current is cut off is T2, and the control apparatus 104 of the first device 10 can control the charging circuit to enter the constant current charging mode. The constant current charging mode allows quickly charging the battery. In the constant current charging mode, an output current of the first device is a constant current, a voltage of the battery gradually steps up with a charging process, and the charging current may be between a trickle charging current and the rated charging current. The fifth voltage threshold may be a rated voltage or a cutoff voltage of the battery 204, for example, 4.2 V or 4.25 V.

When the voltage value of the battery 204 measured by the voltage and current measurement apparatus 205 is equal to the fifth voltage threshold, the control apparatus 201 controls the switch H2 to change from the on state to the off state. In some embodiments, the fifth voltage threshold may be the rated voltage or the cutoff voltage of the battery 204. In some other embodiments, the fifth voltage threshold may alternatively be a fixed value lower than the rated voltage or the cutoff voltage of the battery 204. For example, the fifth voltage threshold may be 10 mV lower than the charging cutoff voltage of the battery 204. In this case, the current of the first device 10 is cut off, and the control apparatus 104 of the first device 10 starts timing. When the control apparatus 201 of the second device 20 controls the switch H2 to remain in the off state for duration T3, the control apparatus 201 controls the switch H2 to change from the off state to the on state. In this case, the current of the first device 10 is conducted, the control apparatus 104 of the first device 10 determines that duration for which the current is cut off is T3, and the control apparatus 104 of the first device 10 can control the charging circuit to enter the constant voltage charging mode. In the constant voltage charging mode, the first device maintains a constant voltage output, and the charging current is gradually reduced with the charging process until charging is terminated.

In the constant voltage charging mode, as the charging current continuously decreases, the voltage between the two ends of the battery 204 may be lower than the fifth voltage threshold. In some embodiments, when the voltage value of the battery 204 measured by the voltage and current measurement apparatus 205 is less than the fifth voltage threshold and reaches a sixth voltage threshold, the control apparatus 201 controls the switch H2 to change from the on state to the off state. In this case, the current of the first device 10 is cut off, and the control apparatus 104 of the first device 10 starts timing. When the control apparatus 201 of the second device 20 controls the switch H2 to remain in the off state for duration T4, the control apparatus 201 controls the switch H2 to change from the off state to the on state. In this case, the current of the first device 10 is conducted, the control apparatus 104 of the first device 10 determines that duration for which the current is cut off is T4, and the control apparatus 104 of the first device 10 can control the buck-boost charging circuit 103 to step up an output voltage. In some embodiments, the charging circuit may step up for a third voltage on the basis of a current output voltage. The third voltage may be a fixed value, for example, 10 mV, 20 mV, 100 mV, or another voltage value preset by a system.

In some embodiments, when the voltage value of the battery 204 measured by the voltage and current measurement apparatus 205 is greater than the fifth voltage threshold and reaches a seventh voltage threshold, the control apparatus 201 controls the switch H2 to change from the on state to the off state. In this case, the current of the first device 10 is cut off, and the control apparatus 104 of the first device 10 starts timing. When the control apparatus 201 of the second device 20 controls the switch H2 to remain in the off state for duration T5, the control apparatus 201 controls the switch H2 to change from the off state to the on state. In this case, the current of the first device 10 is conducted, the control apparatus 104 of the first device 10 determines that duration for which the current is cut off is T5, and the control apparatus 104 of the first device 10 can control the buck-boost charging circuit 103 to step down an output voltage. In some embodiments, the first device 10 may step down a fourth voltage on the basis of a current output voltage. The fourth voltage may be a fixed value, for example, 10 mV, 20 mV, 100 mV, or another voltage value preset by a system.

In some other embodiments, the second device 20 can detect an overvoltage condition and/or an overcurrent condition in the circuit. The control apparatus 201 can control the switch H2 to enter the off state and remain in the off state for specific time (for example, under the overvoltage condition, the control apparatus controls the switch H2 to be turned off for duration T6; under the overcurrent condition, the control apparatus controls the switch H2 to be turned off for duration T7; and under the overvoltage condition and the overcurrent condition, the control apparatus controls the switch H2 to be turned off for duration T8). The control apparatus 104 of the first device 10 can measure duration during which the switch is turned off, to obtain an indication of an overvoltage and/or overcurrent state.

In some embodiments, the first device 10 may include a current measurement apparatus, to obtain a change of the current in the circuit when a state of the switch H2 changes.

It may be understood that the charging mode is not limited to the foregoing enumerated modes, and may further include another mode. Correspondingly, the first device 10 and the second device 20 may set, based on a quantity of charging modes, a type of duration in which a switch is turned off, to transmit the charging mode information based on the duration in which the switch is turned off.

In some other embodiments, the first device 10 may include switches C1 and H1. The switch C1 is configured to control a communication circuit in the first device 10 to be connected or disconnected, and the switch H1 is configured to control a charging circuit in the first device 10 to be connected or disconnected. The second device 20 may include the switch C2. The switch C2 is configured to control a communication circuit in the second device 20 to be connected or disconnected. Based on the circuit, step S302 may further be as follows: The first device 10 and the second device 20 may separately conduct the charging circuit and the communication circuit by controlling the switches C1, C2, H1, and H2 to be turned on and off. Charging mode indication information is transmitted through the communication circuit, and charging is performed through the charging circuit in a corresponding charging mode. The charging mode indication information is used to indicate a charging mode. In some other embodiments, after the communication circuit is connected, the control apparatus 201 of the second device 20 may send indication information to the control apparatus 104 of the first device 10. The indication information may be used to indicate a current voltage value, for example, the current voltage value is less than the fourth voltage threshold.

Specifically, when the voltage value of the battery 204 measured by the voltage and current measurement apparatus 205 is less than the fourth voltage threshold, the control apparatus 201 controls the switch H2 to change from the on state to the off state, and the switch C2 to be in the on state. In this case, the current of the first device 10 is cut off, the control apparatus 104 controls the switch H1 to change from the on state to the off state, and the switch C1 to be in the on state. In this case, the communication circuits in the first device 10 and the second device 20 are connected. The control apparatus 201 of the second device 20 sends the charging mode indication information to the control apparatus 104 of the first device 10. The charging mode indication information indicates that a current charging mode is the trickle charging mode. After sending the charging mode indication information, the control apparatus 201 of the second device 20 controls the switch H2 to change from the off state to the on state. After receiving the charging mode indication information, the control apparatus 104 of the first device 10 regulates an output voltage value and an output current value based on a charging mode indicated by the indication information, and the control apparatus 104 controls the switch H1 to change from the off state to the on state. In this case, the charging circuits in the first device 10 and the second device 20 are connected. The first device 10 charges the second device 20 in the trickle charging mode.

When the voltage value or the current value measured by the voltage and current measurement apparatus meets another charging mode, the second device 20 and the first device 10 may perform operations according to the foregoing procedure, transmit the charging mode indication information, and perform charging in a corresponding charging mode. Details are not described herein again.

In some other embodiments, the first device 10 may include a voltage measurement apparatus. The voltage measurement apparatus is configured to measure a voltage between the contact 100a and the contact 100b. When H2 is in the on state, the voltage between the contacts 100a and 100b is the voltage between the two ends of the battery 204. Therefore, a charging mode may be determined by measuring the voltage between the contacts 100a and 100b.

The trickle charging mode, the constant current charging mode, and the constant voltage charging mode are still used as an example. The foregoing step S302 may be: The first device 10 determines a charging mode based on the voltage value between the contacts 100a and 100b measured by the voltage measurement apparatus.

When the voltage value between the contacts 100a and 100b measured by the voltage measurement apparatus is less than the fourth voltage threshold, it is determined that the charging mode is the trickle charging mode. When the voltage value between the contacts 100a and 100b measured by the voltage measurement apparatus is between the fourth voltage threshold and the fifth voltage threshold, it is determined that the charging mode is the constant current charging mode. When the voltage value between the contacts 100a and 100b measured by the voltage measurement apparatus is equal to the fifth voltage threshold, it is determined that the charging mode is the constant voltage charging mode.

By using the foregoing circuit and charging mode, the charged apparatus can indicate a charging mode and a circuit status by controlling a change of a switch status, so that the charging apparatus can accurately obtain charging mode information and circuit status information.

Implementations of the present invention may be combined at random to implement different technical effects.

In an implementation process, steps in the foregoing methods may be implemented by using a hardware integrated logical circuit in the processor or by using instructions in a form of software. The steps in the methods disclosed with reference to embodiments of this application may be directly performed by a hardware processor, or may be performed by a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor. To avoid repetition, details are not described herein again.

It should be understood that sequence numbers of the foregoing processes do not mean execution sequences in embodiments of this application. The execution sequences of the processes should be determined based on functions and internal logic of the processes, and should not constitute any limitation on implementation processes of embodiments of this application.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on the computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The available medium may be a magnetic medium (for example, a floppy disk, a hard disk drive, or a magnetic tape), an optical medium (for example, a DVD), a semiconductor medium (for example, a solid state drive Solid State Disk (SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A charging system, comprising a first device and a second device, wherein the first device comprises a first contact and a second contact, the second device comprises a third contact and a fourth contact, the first device is connected to the second device using the first contact, the second contact, the third contact and the fourth contact, and the first device charges the second device, and wherein:

the second device further comprises a first energy storage apparatus;

the first device further comprises a first interface, a first circuit, a first control apparatus, a first voltage measurement apparatus, and a first current measurement apparatus, wherein a first terminal of the first voltage measurement apparatus is connected to the first contact, a second terminal of the first voltage measurement apparatus is connected to the second contact, and a third terminal of the first voltage measurement apparatus is connected to the first control apparatus;

the first interface is configured to connect to an external power supply;

the first interface is connected to the first circuit;

the first circuit comprises a voltage regulation circuit;

the voltage regulation circuit is configured to: when the first device is connected to the second device, step down an output voltage of the first device based on a voltage between the first contact and the second contact of the first device, to charge the second device;

the first voltage measurement apparatus is configured to measure the voltage between the first contact and the second contact;

the first current measurement apparatus is configured to measure a current in a circuit of the first device;

the first control apparatus is connected to the first circuit, the first voltage measurement apparatus and the first current measurement apparatus; and the first control apparatus is configured to control, in a charging process of the first device charging the second device, the first circuit to regulate a charging voltage or a charging current.

2. The charging system according to claim 1, wherein the voltage regulation circuit is further configured to: when the first device is connected to the second device, step up the output voltage based on the voltage between the first contact and the second contact, to charge the second device.

3. The charging system according to claim 1, wherein the second device further comprises a first switch, a second control apparatus, a second voltage measurement apparatus, and a second current measurement apparatus, and wherein:

the second control apparatus is connected to the second voltage measurement apparatus, the second current measurement apparatus, and the first switch;

the second voltage measurement apparatus is configured to measure a voltage between two ends of the first energy storage apparatus;

the second current measurement apparatus is configured to measure a current in a circuit of the second device;

the first switch is connected to the third contact and the first energy storage apparatus;

the second control apparatus is configured to control, based on a voltage value measured by the second voltage measurement apparatus or a current value measured by the second current measurement apparatus, the first switch to be turned on or off;

when the first switch is turned on, the third contact of the second device is connected to the first energy storage apparatus; and when the first switch is turned off, the third contact is disconnected from the first energy storage apparatus.

4. The charging system according to claim 3, wherein:
when the second device meets a first condition,
the second control apparatus is further configured to control the first switch to be turned off for first duration; and
the first control apparatus is further configured to, when determining that a current value of a circuit of the first device is 0, step down the charging voltage or reduce the charging current; and
wherein the first condition is that the voltage between the two ends of the first energy storage apparatus is greater than a first voltage threshold, or a current value of the second device is greater than a first current threshold.

5. The charging system according to claim 3, wherein when the voltage value between the two ends of the first energy storage apparatus exceeds a first voltage threshold, the second control apparatus is further configured to control the first switch to be turned off for first duration, and the first control apparatus is further configured to control, based on the first duration, the first circuit to step down the output voltage; and
when a current value of the second device exceeds a first current threshold, the second control apparatus is further configured to control the first switch to be turned off for second duration, and the first control apparatus is further configured to control, based on the second duration, the first circuit to reduce a current.

6. The charging system according to claim 3, wherein:
when the voltage value between the two ends of the first energy storage apparatus is less than a second voltage threshold, the second control apparatus is further configured to control the first switch to be turned off for third duration, and the first control apparatus is further configured to control, based on the third duration, the first circuit to charge the second device in a first mode;
when the voltage between the two ends of the first energy storage apparatus is greater than the second voltage threshold and less than a third voltage threshold, the second control apparatus is further configured to control the first switch to be turned off for fourth duration, and the first control apparatus is further configured to control, based on the fourth duration, the first circuit to charge the second device in a second mode; or
when the voltage between the two ends of the first energy storage apparatus is equal to the third voltage threshold, the second control apparatus is further configured to control the first switch to be turned off for fifth duration, and the first control apparatus is further configured to control, based on the fifth duration, the first circuit to charge the second device in a third mode.

7. The charging system according to claim 3, wherein:
the second device further comprises a second switch, and the first device comprises a third switch and a fourth switch;
the second switch is connected to the third contact and the second control apparatus, the third switch is connected to the first contact and the first circuit, and the fourth switch is connected to the first contact and the first control apparatus; and
the second control apparatus is further configured to control the second switch to be turned on or off, and the first control apparatus is further configured to separately control the third switch and the fourth switch to be turned on or off.

8. The charging system according to claim 7, wherein:
when the second device meets a second condition, the second control apparatus is further configured to control the first switch to be turned off and the second switch to be turned on;
the first control apparatus is further configured to determine that a current value of a circuit is 0, and control the third switch to be turned off and the fourth switch to be turned on;
and the second control apparatus is further configured to send first information to the first control apparatus, wherein the first information indicates a charging mode corresponding to the second condition; and
wherein the second condition is that the voltage between the two ends of the first energy storage apparatus is less than a first voltage threshold, or is greater than the first voltage threshold and less than a second voltage threshold, or is equal to the second voltage threshold.

9. The charging system according to claim 3, wherein:
the first switch is a bidirectional switch, and the first switch is connected to the first energy storage apparatus and the second control apparatus;
the first device comprises a fifth switch, the fifth switch is a bidirectional switch, and the fifth switch is connected to the first circuit and the first control apparatus; and
the second control apparatus is further configured to control the first switch to be connected to the first energy storage apparatus or the second control apparatus, and the first control apparatus is further configured to control the fifth switch to be connected to the first circuit or the first control apparatus.

10. A charging device comprising:
a first contact, a second contact, a first interface, a first circuit, a first control apparatus, a first voltage measurement apparatus, and a first current measurement apparatus;
wherein:
the first interface is configured to connect to an external power supply, and the first interface is connected to the first circuit;
the first circuit comprises a voltage regulation circuit, and the voltage regulation circuit is configured to step down an output voltage of the charging device based on a voltage between the first contact and the second contact;
a first terminal of the first voltage measurement apparatus is connected to the first contact, a second terminal of the first voltage measurement apparatus is connected to the second contact, and a third terminal of the first voltage measurement apparatus is connected to the first control apparatus;
the first voltage measurement apparatus is configured to measure the voltage between the first contact and the second contact, and the first current measurement apparatus is configured to measure a current in a circuit; and
the first control apparatus is connected to the first circuit, the first voltage measurement apparatus and the first current measurement apparatus; and the first control apparatus is configured to control, in a charging process, the first circuit to regulate a charging voltage or a charging current.

11. The charging device according to claim 10, wherein the voltage regulation circuit is further configured to: when the charging device is connected to a second device to be charged, step up the output voltage based on the voltage between the first contact and the second contact.

12. The charging device according to claim 10, wherein the first control apparatus is further configured to determine that a current value of a circuit is 0, and step down the charging voltage or reduce the charging current.

13. The charging device according to claim 10, wherein the first control apparatus is further configured to:
- determine that a current value of a circuit is 0 for first duration, and control, based on the first duration, the first circuit to step down the output voltage; and
- determine that the current value of the circuit is 0 for second duration, and control, based on the second duration, the first circuit to reduce a current.

14. The charging device according to claim 10, wherein the first control apparatus is further configured to:
- determine that a current value of a circuit is 0 for third duration, and control, based on the third duration, the first circuit to charge in a first mode;
- determine that the current value of the circuit is 0 for fourth duration, and control, based on the fourth duration, the first circuit to charge in a second mode; or
- determine that the current value of the circuit is 0 for fifth duration, and control, based on the fifth duration, the first circuit to charge in a third mode.

15. The charging device according to claim 10, further comprising a first switch and a second switch; wherein the first switch is connected to the first contact and the first circuit, and the second switch is connected to the first contact and the first control apparatus; and the first control apparatus is configured to separately control the first switch and the second switch to be turned on or off.

16. The charging device according to claim 15, wherein the first control apparatus is further configured to: determine that a current value of a circuit is 0, control the first switch to be turned off and the second switch to be turned on, receive first information, and perform charging in a charging mode indicated by the first information, wherein the first information indicates charging mode information.

17. The charging device according to claim 10, further comprising a third switch, wherein the third switch is a bidirectional switch, and the third switch is connected to the first circuit and the first control apparatus; and the first control apparatus is further configured to control the third switch to be connected to the first circuit or the first control apparatus.

18. A device that is chargeable, comprising:
a first contact, a second contact, a first energy storage apparatus, a first switch, a first control apparatus, a first voltage measurement apparatus, and a first current measurement apparatus, wherein
the first control apparatus is connected to the first voltage measurement apparatus, the first current measurement apparatus and the first switch;
a first terminal of the first voltage measurement apparatus is connected to the first contact, a second terminal of the first voltage measurement apparatus is connected to the second contact, and a third terminal of the first voltage measurement apparatus is connected to the first control apparatus;
the first voltage measurement apparatus is configured to measure a voltage between two ends of the first energy storage apparatus;
the first current measurement apparatus is configured to measure a current in a circuit;
the first switch is connected to the first contact and the first energy storage apparatus; and
the first control apparatus is configured to control, based on a voltage value measured by the first voltage measurement apparatus or a current value measured by the first current measurement apparatus, the first switch to be turned on or off; and when the first switch is turned on, the first contact is connected to the first energy storage apparatus, and when the first switch is turned off, the first contact is disconnected from the first energy storage apparatus.

19. The device according to claim 18, wherein when the voltage between the two ends of the first energy storage apparatus exceeds a first voltage threshold or a current value of the first energy storage apparatus exceeds a first current threshold, the first control apparatus is configured to control the first switch to be turned off.

20. The device according to claim 18, wherein when the voltage between the two ends of the first energy storage apparatus exceeds a first voltage threshold, the first control apparatus is configured to control the first switch to be turned off for first duration; and when a current value of the first energy storage apparatus exceeds a first current threshold, the first control apparatus is configured to control the first switch to be turned off for second duration.

* * * * *